US009941734B2

(12) United States Patent
Sano et al.

(10) Patent No.: US 9,941,734 B2
(45) Date of Patent: Apr. 10, 2018

(54) STORAGE BATTERY SYSTEM AND SOLAR POWER GENERATION SYSTEM HAVING THE SAME

(71) Applicant: Hitachi, Ltd., Chiyoda-ku, Tokyo (JP)

(72) Inventors: Yuko Sano, Tokyo (JP); Kenji Takeda, Tokyo (JP); Kenichirou Beppu, Tokyo (JP); Yuuji Nagashima, Tokyo (JP); Taichi Nomura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 15/007,492

(22) Filed: Jan. 27, 2016

(65) Prior Publication Data

US 2016/0218551 A1 Jul. 28, 2016

(30) Foreign Application Priority Data

Jan. 28, 2015 (JP) .................................. 2015-013799

(51) Int. Cl.
| | |
|---|---|
| H02J 7/35 | (2006.01) |
| H02S 40/38 | (2014.01) |
| H02S 40/30 | (2014.01) |
| H02J 3/32 | (2006.01) |
| H02J 3/38 | (2006.01) |

(52) U.S. Cl.
CPC .................. *H02J 7/35* (2013.01); *H02J 3/32* (2013.01); *H02J 3/383* (2013.01); *H02S 40/30* (2014.12); *H02S 40/38* (2014.12); *Y02E 10/563* (2013.01); *Y02E 10/566* (2013.01); *Y02E 70/30* (2013.01)

(58) Field of Classification Search
None
See application file for complete search history.

(56) References Cited

U.S. PATENT DOCUMENTS

| | | | | |
|---|---|---|---|---|
| 8,227,937 B2 * | 7/2012 | Barlock | ..................... | H02J 7/35 307/66 |
| 8,914,158 B2 * | 12/2014 | Geinzer | ..................... | H02J 3/32 700/295 |
| 9,507,364 B2 * | 11/2016 | Sowder | ..................... | G05F 1/67 |
| 9,705,328 B2 * | 7/2017 | Kusunose | ............... | H02J 3/006 |

FOREIGN PATENT DOCUMENTS

JP 2010-22122 A 1/2010

* cited by examiner

*Primary Examiner* — Jeffrey Zweizig
(74) *Attorney, Agent, or Firm* — Crowell & Moring LLP

(57) ABSTRACT

A solar power generation system includes a storage battery, a solar power generation device that is provided on the side of the storage battery and outputs solar generated power, and a power control device. The power control device includes a variation component extraction unit that extracts a shade variation component from a generated power signal measured by the solar power generation device, a smoothing unit that smoothens the shade variation component obtained by the variation component extraction unit, a system output correction unit that obtains a system output power target value which is a combined output between a discharge output of the storage battery and the solar generated power on the basis of an output signal from the smoothing unit, and a charge/discharge output correction unit that corrects a charge/discharge target value which is a difference between the system output power target value and the generated power signal on the basis of a current time and a state of charge of the storage battery.

15 Claims, 17 Drawing Sheets

Fig. 17
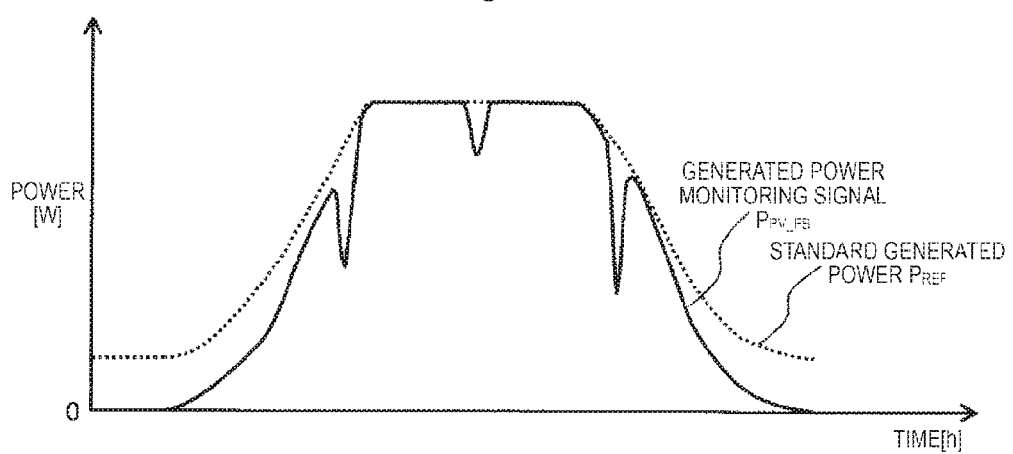
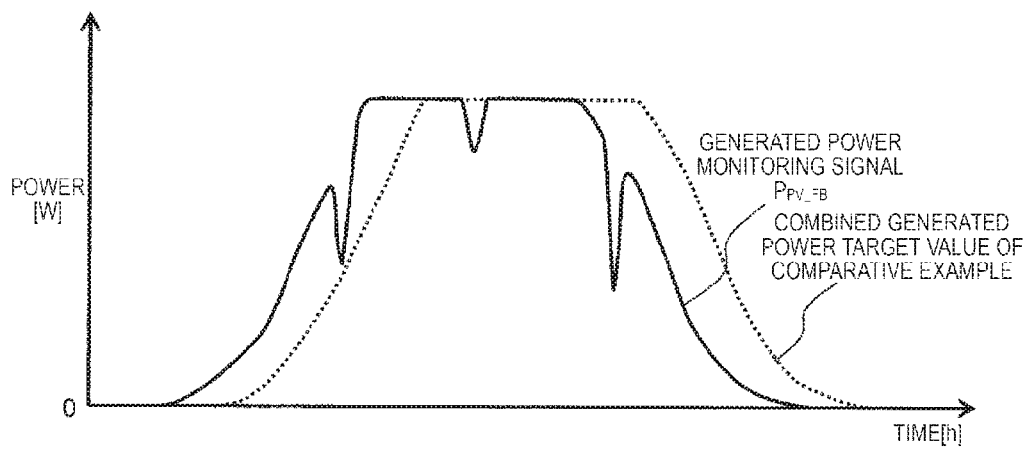

STORAGE BATTERY SYSTEM AND SOLAR POWER GENERATION SYSTEM HAVING THE SAME

BACKGROUND OF THE INVENTION

Field of the Invention

The present invention relates to a solar power generation system, and particularly to a solar power generation system having a storage battery system which is suitable for minimizing a variation in solar generated power.

Background Art

In recent years, introduction of a solar power generation system has been promoted due to environmental problems and the like. However, output power generated through solar power generation greatly varies depending on the weather, and this causes a voltage variation or a frequency variation of an associated power system. As a countermeasure therefor, a storage battery system for minimizing the variation is also provided in the solar power generation system, and an output from the power system is smoothed by charging and discharging the storage battery system.

JP-A-2010-22122 has proposed such a solar power generation system. JP-A-2010-22122 discloses a configuration in which effective power output from a natural energy power source including solar power generation is detected, and a charge/discharge command value for a storage battery is obtained on the basis of a difference between the detected effective power and a combined output value which is obtained for the effective power via a change-rate limiter. In addition, a primary delay filter is provided between an effective power detector and the change-range limiter so as to smoothen an effective power detection value. Further, it is disclosed that delay operators which are connected in series to each other are provided instead of the primary delay filter, items of effective power obtained during a plurality of sampling cycles are added together, an average value thereof is obtained and is input to the change-rate limiter, and thus even in a case where an output of the natural energy power source periodically varies in a spike shape, this case is handled by reducing the capacity of the storage battery.

SUMMARY OF THE INVENTION

However, in JP-A-2010-22122, a combined output target value is calculated by obtaining a moving average of effective power from the natural energy power source by using the primary delay filter or a plurality of delay operators which are connected in series to each other. Thus, there is a deviation between the obtained combined output target value and a measured effective power profile of the natural energy power source. Charging or discharging of the storage battery is required to be performed depending on a deviation amount, and, as a result, the capacity of the storage battery is required to be secured by the deviation amount. Therefore, in the configuration disclosed in JP-A-2010-22122, there is a limitation in reduction of the capacity of the storage battery. In addition, JP-A-2010-22122 does not take into consideration, for example, a configuration in which a state of charge of the storage battery is controlled at night.

Therefore, an object of the present invention is to provide a storage battery system which can maintain performance of minimizing a solar generated power variation, reduce storage battery capacity, and lengthen the life of the storage battery, and a solar power generation system having the storage battery system.

In order to solve the above-described problems, according to an aspect of the present invention, there is provided a solar power generation system including (1) a storage battery; (2) a solar power generation device that is provided on the side of the storage battery and outputs solar generated power; and (3) a power control device. The power control device includes a variation component extraction unit that extracts a shade variation component from a generated power signal measured by the solar power generation device; a smoothing unit that smoothens the shade variation component obtained by the variation component extraction unit; a system output correction unit that obtains a system output power target value which is a combined output between a discharge output of the storage battery and the solar generated power on the basis of an output signal from the smoothing unit; and a charge/discharge output correction unit that corrects a charge/discharge target value which is a difference between the system output power target value and the generated power signal on the basis of a current time and a state of charge of the storage battery.

According to another aspect of the present invention, there is provided a storage battery system including (1) a storage battery that performs charging and discharging with solar generated power output from a solar power generation device; and (2) a power control device. The power control device includes a variation component extraction unit that extracts a shade variation component from a generated power signal measured by the solar power generation device; a smoothing unit that smoothens the shade variation component obtained by the variation component extraction unit; a system output correction unit that obtains a system output power target value which is a combined output between a discharge output of the storage battery and the solar generated power on the basis of an output signal from the smoothing unit; and a charge/discharge output correction unit that corrects a charge/discharge target value which is a difference between the system output power target value and the generated power signal on the basis of a current time and a state of charge of the storage battery.

According to still another aspect of the present invention, there is provided a power control device including a variation component extraction unit that extracts a shade variation component from a generated power signal measured by the solar power generation device; a smoothing unit that smoothens the shade variation component obtained by the variation component extraction unit; a system output correction unit that obtains a system output power target value which is a combined output between a discharge output of the storage battery and the solar generated power on the basis of an output signal from the smoothing unit; and a charge/discharge output correction unit that corrects a charge/discharge target value which is a difference between the system output power target value and the generated power signal on the basis of a current time and a state of charge of the storage battery.

According to the present invention, it is possible to provide a storage battery system which can maintain performance of minimizing a solar generated power variation, reduce storage battery capacity, and lengthen the life of the storage battery, and a solar power generation system having the storage battery system.

For example, a difference between power generated through solar power generation and a system output power target value including compensation performed by the storage battery is reduced, and thus it is possible to further reduce storage battery capacity while maintaining the performance of minimizing a variation in the solar generated power. Particularly, since a state of charge of the storage battery at night is controlled depending on characteristics of the storage battery, the life of the storage battery can be lengthened.

Objects, configurations, and effects other than the above description will become apparent through description of the following embodiments.

BRIEF DESCRIPTION OF THE DRAWINGS

FIG. 17 illustrates temporal changes of a generated power monitoring signal and standard generated power in Example 2 and a comparative example.

DETAILED DESCRIPTION OF THE INVENTION

In the present specification, "standard generated power $P_{REF}$" indicates generated power which is obtained by a solar power generation device in fine weather. In addition, a "solar panel" indicates a solar power generation device which is formed of a plurality of solar cells and outputs solar generated power.

Hereinafter, Examples of the present invention will be described with reference to the drawings.

EXAMPLE 1

Figure 1:
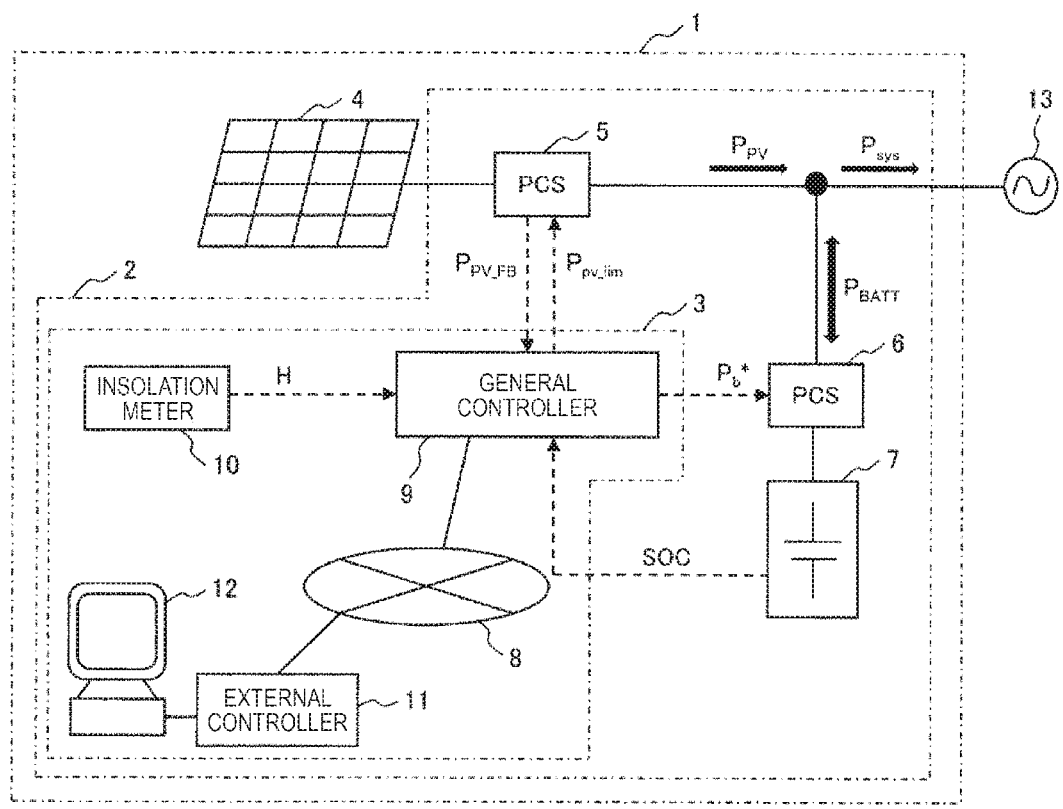
FIG. 1 is a diagram schematically illustrating the entire configuration of a solar power generation system of Example 1 as one Example of the present invention.

FIG. 1 is a diagram schematically illustrating the entire configuration of a solar power generation system of Example 1 as one Example of the present invention. A solar power generation system 1 includes a solar panel 4 and a storage battery system 2. The storage battery system 2 includes a storage battery 7, a storage battery power conditioner (power conditioning system (PCS)) 6 (hereinafter, referred to as a storage battery PCS 6), a solar power conditioner (PCS) 5 (hereinafter, referred to as a solar PCS), and a power control device 3. The power control device 3 includes a general controller 9, an insolation meter 10, an external controller 11 which can perform communication with the general controller 9 via a network 8 such as the Internet, and a terminal 12 which is connected to the external controller 11 via a serial bus or a parallel bus. The solar power generation system 1 can be easily configured by connecting the storage battery system 2 to an existing or a new solar panel 4 via power lines. In addition, the solar power generation system 1 can be easily configured by connecting the power control device 3 to an equipment including the existing solar panel 4, the storage battery 7, the solar PCS 5, and the storage battery PCS 6 via signal lines.

The solar panel 4 generates power by using sunlight, and solar generated power $P_{PV}$ is converted from DC power into AC power via the solar PCS 5 constituting the storage battery system 2 and is supplied to a power system 13. The storage battery 7 performs charging and discharging on the power system 13 with charge/discharge power $P_{BATT}$ via the storage battery PCS 6. As a result, a total system output $P_{SYS}$ for the power system 13 is a combined output of the solar generated power $P_{PV}$ and the charge/discharge power $P_{BATT}$, and thus a variation in the solar generated power $P_{PV}$ due to a shade variation component such as a cloud is canceled (compensated) by the charge/discharge power $P_{BATT}$ so that the system output $P_{SYS}$ is smoothened. In other words, the storage battery system 2 has a function of minimizing a variation in the solar generated power $P_{PV}$. Here, the solar panel 4 has a configuration in which, for example, a plurality of solar cells based on silicon of the monocrystalline silicon type, the polycrystalline silicon type, the microcrystalline silicon type, or the amorphous silicon type, or based on a compound such as InGaAs, GaAs, or CuInS$_2$ (CIS) are connected in series and parallel to each other. The organic solar panel 4 using a dye sensitized solar cell or an organic thin film solar cell may be employed. The power conditioner (PCS) is referred to as a system interconnection inverter in some cases. The solar generated power $P_{PV}$ from the solar panel 4 is limited by the capacity of the solar PCS 5 via the solar PCS 5. For example, in a case where the solar generated power $P_{PV}$ from the solar panel 4 is 4.2 kW, and the capacity of the solar PCS 5 is 4.0 kW, the solar generated power $P_{PV}$ is limited to 4.0 kW via the solar PCS 5.

The general controller 9 constituting the power control device 3, as will be described later, calculates a system output power target value $P_{SYS}^*$ which is used as a reference for minimizing a variation, obtains a charge/discharge target value $P_b^*$ on the basis of the obtained system output power target value $P_{SYS}^*$, and outputs the value to the storage battery PCS 6. The general controller 9 is configured to acquire a generated power monitoring signal $P_{PV\_FB}$ which is a monitoring signal of the solar generated power $P_{PV}$ measured by the solar PCS 5, an insolation amount H measured by the insolation meter 10, and a state of charge (SOC) of the storage battery 7. The general controller 9 has a function of setting a solar generated power upper limit value $P_{PV\_lim}$ which is an upper limit value of the solar generated power $P_{PV}$ in the solar PCS 5. In FIG. 1, each of the solar PCS 5 and the storage battery PCS 6 is provided alone, but the present invention is not limited thereto. For example, a large-scale solar power generation system 1 such as a mega-solar system including a plurality of solar panels 4 may have a configuration in which a plurality of solar PCSs 5 are provided in accordance with the plurality of solar panels 4, and a plurality of storage battery PCSs 6 are provided in accordance with a plurality of storage batteries 7. In this case, the general controller 9 calculates a sum value of the plurality of solar PCSs 5 as the system output power target value $P_{SYS}{}^*$. Similarly, the general controller 9 calculates a sum value of the plurality of storage battery PCSs 6 as the charge/discharge target value $P_b{}^*$. The generated power monitoring signal $P_{PV\_FB}$ may be measured by a power system or the like which is separately provided in the solar PCS 5.

Figure 2:
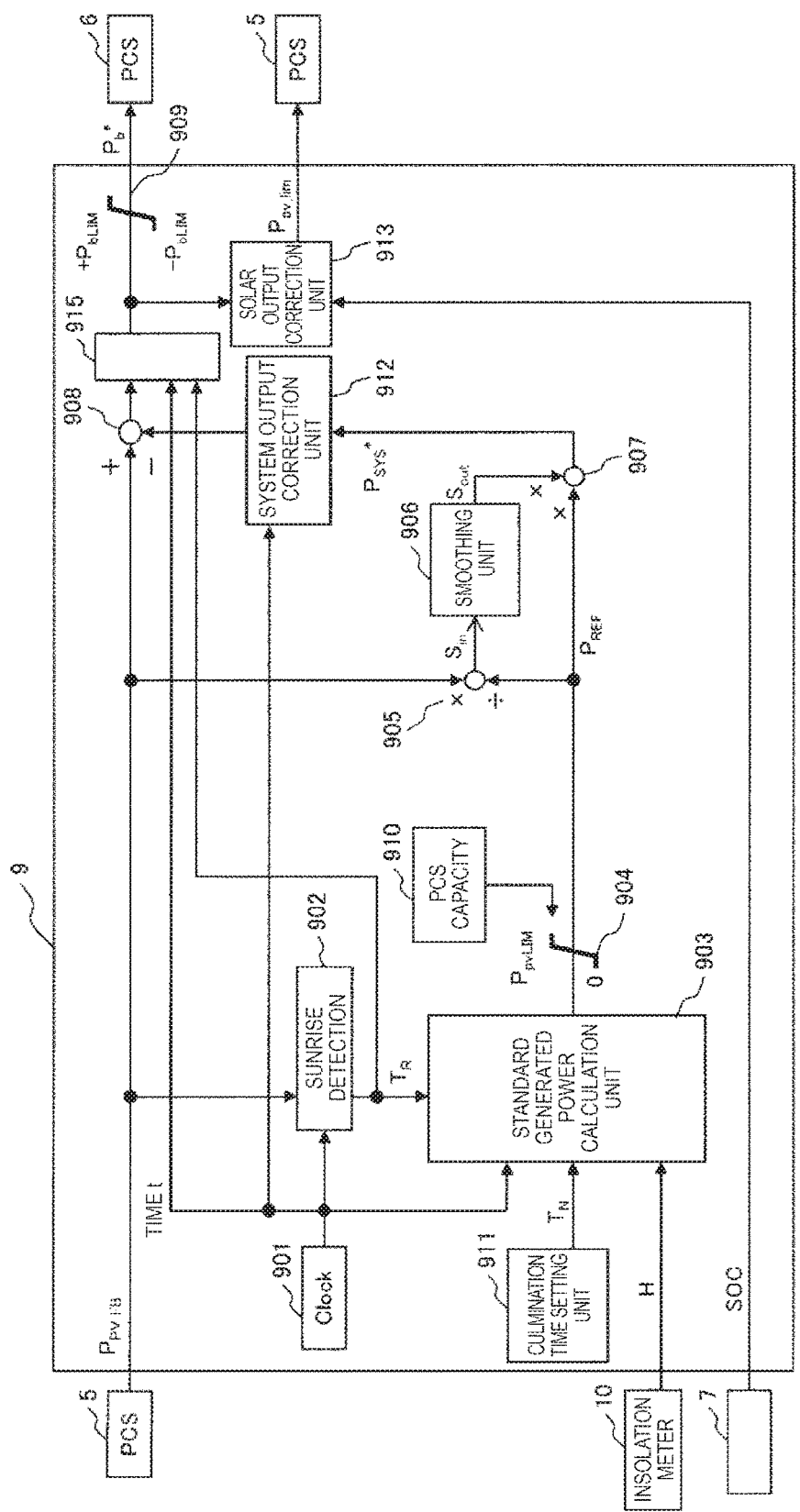
FIG. 2 is a functional block diagram of a general controller illustrated in FIG. 1.

Next, a description will be made of a configuration of the general controller 9. FIG. 2 is a functional block diagram of the general controller 9. The general controller 9 includes a clocking unit 901, a sunrise detection unit 902, a standard generated power calculation unit 903, a first upper/lower limit limiter 904, a normalization unit 905, a smoothing unit 906, a recovery unit 907, a subtractor 908, a second upper/lower limit limiter 909, a solar PCS power upper limit setting unit 910, a culmination time setting unit 911, a system output correction unit 912, a solar output correction unit 913, and a charge/discharge output correction unit 915. Each of the standard generated power calculation unit 903, the system output correction unit 912, the solar output correction unit 913, and the charge/discharge output correction unit 915 is constituted of, for example, a processor such as a CPU (not illustrated), and a storage portion such as a ROM and a RAM. The ROM stores a program for calculating standard generated power, a program for calculating system output correction, a program for solar output correction, and a program for calculating charge/discharge output correction. The RAM temporarily stores data which is being calculated by the processor or data used for calculation.

As illustrated in FIG. 2, the generated power monitoring signal $P_{PV\_FB}$ measured by the solar PCS 5 branches so as to be input to the sunrise detection unit 902, the normalization unit 905, and the subtractor 908. A time point t measured by the clocking unit 901 is input to the sunrise detection unit 902 and the standard generated power calculation unit 903. The standard generated power calculation unit 903 acquires a sunrise time $T_R$ from the sunrise detection unit 902, and a culmination time $T_N$ at which the sun is located at the culmination altitude from the culmination time setting unit 911. The standard generated power calculation unit 903 acquires the insolation amount H from the insolation meter 10. Here, the sunrise detection unit 902 outputs a time point which is stored in advance in a preset storage portion (not illustrated) to the standard generated power calculation unit 903 as the sunrise time $T_R$. Instead of the above-described configuration, the sunrise detection unit 902 may be configured to monitor the generated power monitoring signal $P_{PV\_FB}$ measured by the solar PCS 5, and to obtain the sunrise time $T_R$ with a change from rising of the generated power monitoring signal $P_{PV\_FB}$ before dawn, that is, from a zero value to a predetermined positive power as a trigger. The culmination time setting unit 911 stores a time point corresponding to the preset culmination time $T_N$ in a storage portion (not illustrated), reads the culmination time $T_N$ from the storage portion, and outputs the culmination time $T_N$ to the standard generated power calculation unit 903. Alternatively, the culmination time setting unit 911 may be configured to obtain the culmination time $T_N$ through calculation on the basis of input latitude and longitude information of an installation location of the solar panel 4.

The standard generated power calculation unit 903 calculates the standard generated power $P_{REF}$ on the basis of the time point t acquired from the clocking unit 901, the culmination time $T_N$ obtained from the culmination time setting unit 911, and the sunrise time $T_R$ obtained from the sunrise detection unit 902. The calculated standard generated power $P_{REF}$ is limited in an upper limit value and a lower limit value thereof by the first upper/lower limit limiter 904 which is provided on the subsequent stage of the standard generated power calculation unit 903. Here, the upper limit value and the lower limit value are set by the solar PCS power upper limit value setting unit 910 in a solar PCS power upper limit value $P_{pvLIM}$ as the upper limit value and a zero value as the lower limit value in the first upper/lower limit limiter 904. Here, the solar PCS power upper limit value $P_{pvLIM}$ is set depending on the capacity of the solar PCS 5 as described above.

Figure 4:
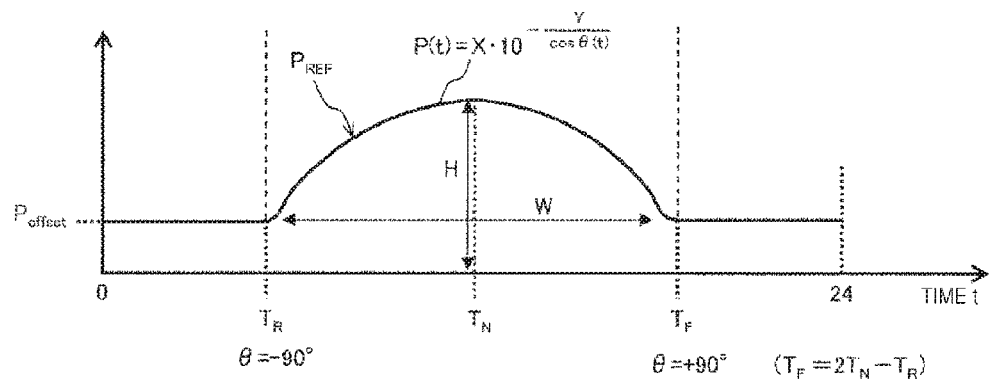
FIG. 4 is a diagram illustrating a standard generated power profile obtained by a standard generated power calculation unit illustrated in FIG. 2.

A description will be made of an example in which the standard generated power calculation unit 903 calculates the standard generated power $P_{REF}$. FIG. 4 is a diagram illustrating a standard generated power profile obtained by the standard generated power calculation unit 903. The standard generated power $P_{REF}$ is calculated as a curve in which 24-hour cyclic components of the solar generated power $P_{PV}$ of that day are substantially drawn, that is, a standard generated power profile. For example, a method is known in which a solar power generation curve obtained on the basis of insolation in fine weather is defined by a trigonometric function. The standard generated power calculation unit 903 calculates the following Equation (1), and adds an offset signal $P_{offset}$ for preventing division by zero to the calculation result so as to obtain the standard generated power $P_{REF}$, that is, the standard generated power profile.

$$P_{REF}(t) = X \cdot 10^{-\frac{Y}{\cos \theta(t)}} + P_{offset} \qquad (1)$$

Here, $T_R \leq t \leq T_F$, and X, and Y are parameters which are arbitrarily set by an operator. The parameter X is a parameter contributing to an amplitude value (gain) of the standard generated power $P_{REF}$, and the parameter Y is a parameter contributing to a definition of duration W between the sunrise time $T_R$ and the sunset time $T_F$. The parameter Y partially contributes to a definition of the amplitude value. In other words, rising of the standard generated power profile at the sunrise time $T_R$ and falling of the standard generated power profile at the sunset time $T_F$ are set to be rapid or smooth according to a set value of the parameter Y. An angle θ in FIG. 4 indicates an angle of sunlight which is incident to the installed solar pane 14, that is, an angle of the sun. Therefore, θ in Equation (1) is set to −90° at the sunrise time $T_R$ and to +90° at the sunset time $T_F$, and the amplitude value at the culmination time $T_N$ is the maximum (H).

Figure 5:
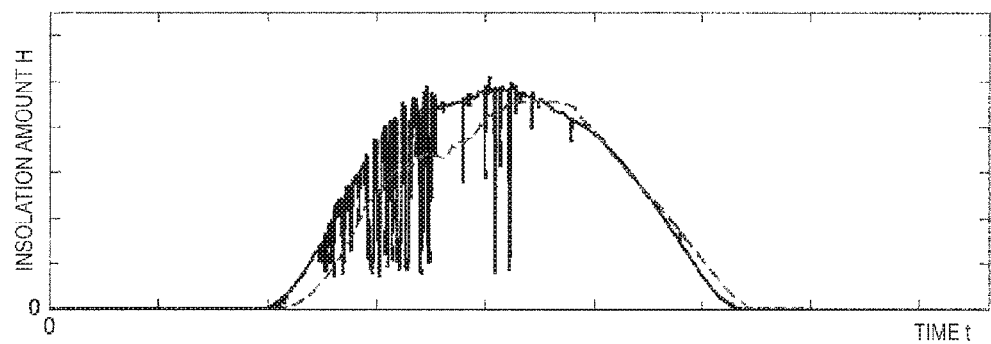
FIG. 5 is a diagram illustrating an insolation amount profile.

FIG. 5 illustrates an insolation amount profile. In FIG. 5, a solid line indicates a profile of the insolation amount H measured by the insolation meter 10, and a dotted line indicates a profile of the insolation amount H after being smoothened. The insolation profile (dotted line) after being smoothened is delayed with respect to the insolation profile (solid line) before being smoothened. The insolation amount H measured by the insolation meter 10 and indicated by the solid line in FIG. 5 exhibits an insolation amount profile to which an oscillation component with a large amplitude is added. This depends on cloud movements corresponding to a weather state, and indicates a profile which rapidly changes every hour in a day (24-hour cycle). In the example illustrated in FIG. 5, cloud movements are large and thus the insolation amount H greatly varies. A change in solar generated power at a relatively long cycle such as being a bit cloudy may be defined by changing the parameters X and Y according to the intensity of the insolation amount H obtained from the insolation meter 10. The standard generated power calculation unit 903 may be configured to correct the standard generated power $P_{REF}$ on the basis of the insolation amount profile illustrated in FIG. 5.

Referring to FIG. 2 again, the normalization unit 905 calculates a shade variation component $S_{in}$ by dividing the generated power monitoring signal $P_{PV\_FB}$ input from the solar PCS 5 by the standard generated power $P_{REF}$ which is calculated by the standard generated power calculation unit 903 and is obtained via the first upper/lower limit limiter 904, and outputs the shade variation component $S_{in}$ to the smoothing unit 906. In other words, the shade variation component $S_{in}$ is obtained as follows.

> Shade variation component $S_{in}$=(generated power monitoring signal $P_{PV\_FB}$)/(standard generated power $P_{REF}$)

The normalization unit 905 is constituted of a divider.

The smoothing unit 906 performs a smoothing process on the shade variation component $S_{in}$ input from the normalization unit 905 so as to calculate a smoothened shade variation component $S_{out}$ which is then output to the recovery unit 907. Here, the smoothing unit 906 is implemented by, for example, a moving average calculation type in which a moving average is calculated by a primary delay filter or a plurality of delay operators which are connected in series to each other, or is implemented by a low-pass filter.

The recovery unit 907 obtains the system output power target value $P_{SYS}^*$ by multiplying the smoothened shade variation component $S_{out}$ input from the smoothing unit 906 by the standard generated power $P_{REF}$ which is calculated by the standard generated power calculation unit 903 and is obtained via the first upper/lower limit limiter 904, and outputs the value to the system output correction unit 912. In other words, the system output power target value $P_{SYS}^*$ is obtained as follows.

> System output power target value $P_{SYS}^*$=smoothened shade variation component $S_{out}$×standard generated power $P_{REF}$ As mentioned above, in the present example, the general controller 9 extracts the shade variation component $S_{in}$ which is a variation factor of the solar generated power $P_{PV}$ on the basis of the generated power monitoring signal $P_{PV\_FB}$ and the standard generated power $P_{REF}$, and smoothens the extracted shade variation component $S_{in}$. The general controller 9 obtains the system output power target value $P_{SYS}^*$ on the basis of the smoothened shade variation component $S_{out}$ after being smoothened and the standard generated power $P_{REF}$, and can thus obtain the system output power target value $P_{SYS}^*$ by reflecting the shade variation component $S_{in}$ therein.

The system output correction unit 912 performs correction calculation which will be described later in detail on the system output power target value $P_{SYS}^*$ obtained from the recovery unit 907, and outputs the system output power target value $P_{SYS}^*$ obtained through the correction calculation to the subtractor 908.

The subtractor 908 subtracts the corrected system output power target value $P_{SYS}^*$ which is output from the system output correction unit 912 from the generated power monitoring signal $P_{PV\_FB}$ which is input from the solar PCS 5, so as to obtain the charge/discharge target value $P_b^*$. The obtained charge/discharge target value $P_b^*$ is output to the charge/discharge output correction unit 915 disposed between the subtractor 908 and the second upper/lower limit limiter 909.

The charge/discharge output correction unit 915 performs correction calculation which will be described later in detail on the input charge/discharge target value $P_b^*$, and outputs the corrected charge/discharge target value $P_b^*$ obtained through the correction calculation to the second upper/lower limit limiter 909 which is provided in the subsequent stage. The charge/discharge target value $P_b^*$ whose upper limit value and lower limit value are limited in the second upper/lower limit limiter 909 is output to the storage battery PCS 6. Here, a storage battery PCS power upper limit value $+P_{bLIM}$ and a storage battery PCS power lower limit value $-P_{bLIM}$ which are set in the second upper/lower limit limiter 909 are set to, for example, values corresponding to limit power of charging or discharging of the storage battery 7 or the storage battery PCS 6.

The solar output correction unit 913 acquires a state of charge (SOC) from the storage battery 7 and also acquires the corrected charge/discharge target value $P_b^*$ output from the charge/discharge output correction unit 915. At this time, in a case where a variation in the system output $P_{SYS}$ illustrated in FIG. 1 is hard to sufficiently minimize, such as a case where the state of charge (SOC) of the storage battery 7 is reduced, the solar output correction unit 913 reduces the upper limit value $P_{PV\_lim}$ of the solar generated power $P_{PV}$ in advance, and outputs the reduced upper limit value $P_{PV\_lim}$ to the solar PCS 5.

The above-described solar PCS power upper limit setting unit 910 may set a value which is conjunct with a variation in the upper limit value $P_{PV\_lim}$ of the solar generated power $P_{PV}$ in the solar output correction unit 913, as the solar PCS power upper limit value $P_{pvLim}$ in the first upper/lower limit limiter 904. The standard generated power calculation unit 903 may be configured to have a function of incorporating weather data.

Figure 3:
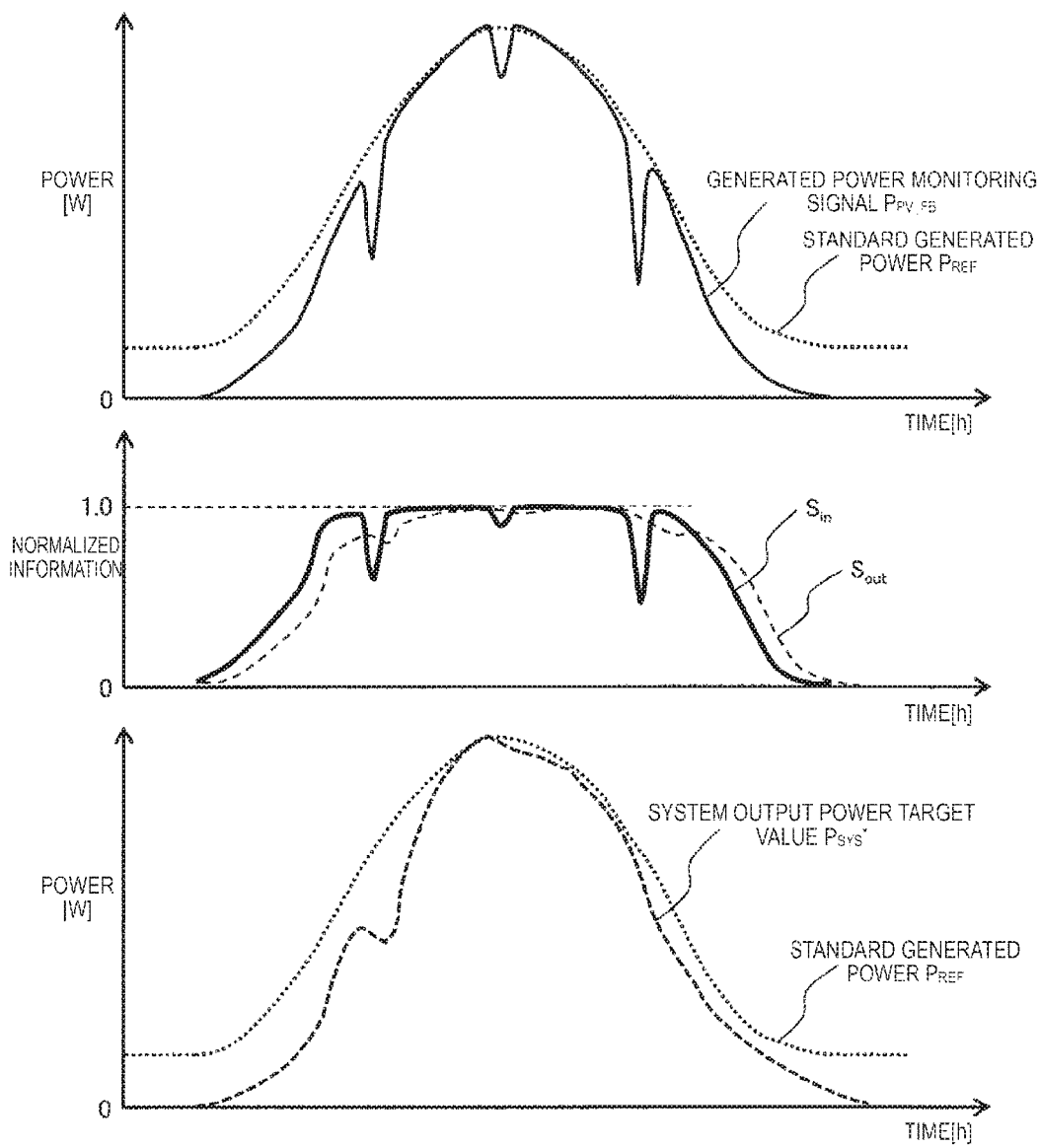
FIG. 3 illustrates a temporal change of each power signal in the general controller illustrated in FIG. 2.

Here, FIG. 3 illustrates a temporal change of each power signal in the general controller 9 illustrated in FIG. 2. On an upper part of FIG. 3, a temporal change of the generated power monitoring signal $P_{PV\_FB}$ input from the solar PCS 5 is indicated by a solid line, and a temporal change of the standard generated power $P_{REF}$ which is calculated by the standard generated power calculation unit 903 and is obtained via the first upper/lower limit limiter 904 is indicated by a dotted line. On an intermediate part thereof, a temporal change of the shade variation component $S_{in}$ output from the normalization unit 905 is indicated by a solid line, and a temporal change of the smoothened shade variation component $S_{out}$ output from the smoothing unit 906 is indicated by a dotted line. On a lower part thereof, a temporal change of the system output power target value $P_{SYS}^*$ output from the recovery unit 907 is indicated by a thick dotted line, and a temporal change of the standard generated power $P_{REF}$ which is calculated by the standard generated power calculation unit 903 and is obtained via the first upper/lower limit limiter 904 is indicated by a dotted line. As illustrated on the upper part of FIG. 3, a variation in the generated power monitoring signal $P_{PV\_FB}$ exhibits a waveform in which a shade variation component for a short period of time is superimposed on a large variation component in a 24-hour cycle, that is, during the morning, the afternoon, and the night. It can be seen that the shade variation component $S_{in}$ obtained by the normalization unit 905 is located around 1.0 for most of the time as illustrated on the intermediate part of FIG. 3, and thus only the shade variation component is extracted by removing the variation component in the 24-hour cycle. It can be seen that the smoothing unit 906 performs the above-described smoothing process on only the shade variation component $S_{in}$ obtained in the above-described way, and thus the system output power target value $P_{SYS}^*$ which is not delayed relative to the variation component in the 24-hour cycle is obtained by the recovery unit 907 as illustrated on the lower part of FIG. 3.

Figure 6:
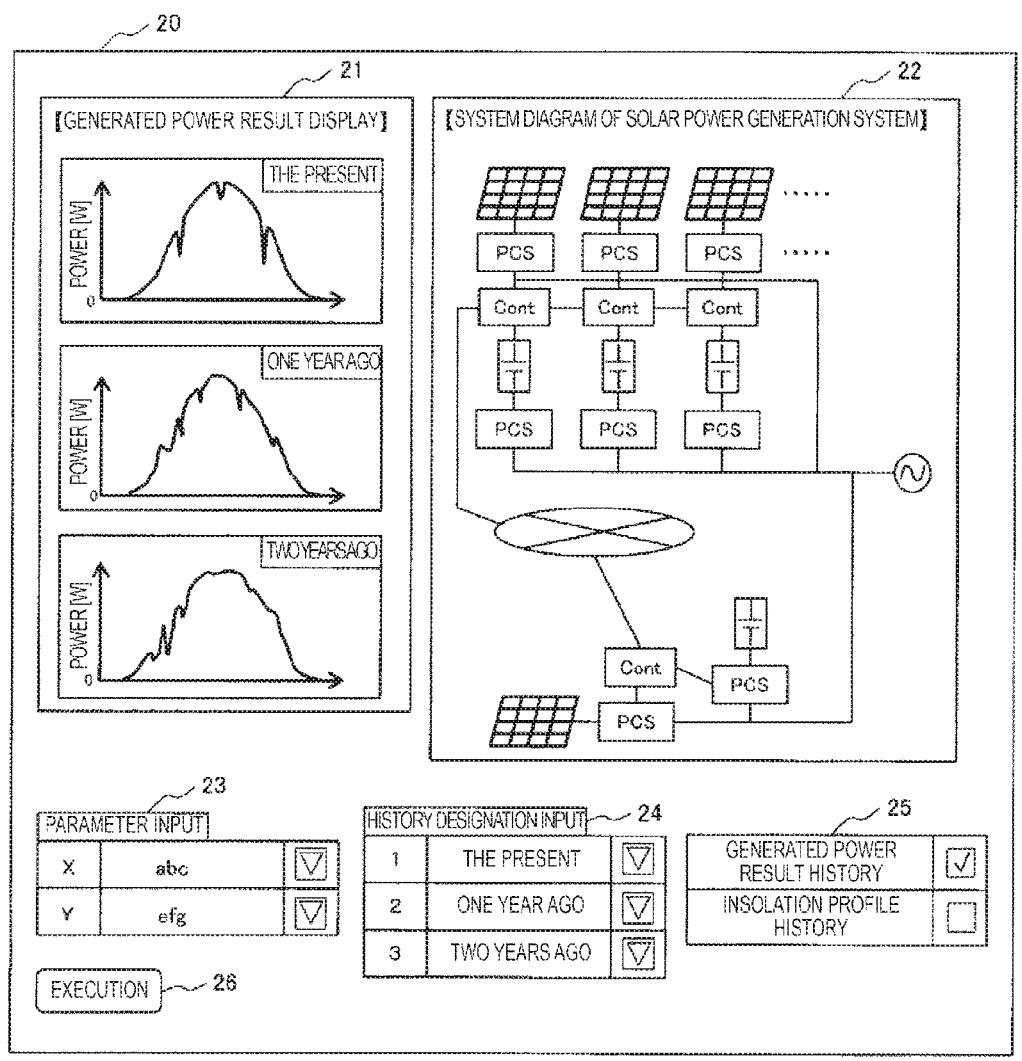
FIG. 6 is a diagram illustrating a screen display example of a terminal illustrated in FIG. 1.

FIG. 6 is a diagram illustrating a screen display example of the terminal 12 illustrated in FIG. 1. As illustrated in FIG. 6, a screen 20 of a display device of the terminal 12 includes a first display region 21, a second display region 22, a parameter input region 23, a history designation input region 24, a history display type designation input region 25, and an execution button 26.

As illustrated in FIG. 6, a system diagram of the solar power generation system is displayed on the second display region 22. In the example illustrated in FIG. 6, in the displayed system diagram, the solar generated power $P_{PV}$ is supplied to the power system by a mega-solar system (large-scale solar power generation system) including a plurality of solar panels, a plurality of solar PCSs, a plurality of storage batteries, a plurality of storage battery PCSs, and general controllers (Cont) provided at the respective solar panels, and a solar power generation system connected to the mega-solar system via a network.

The history display type designation input region 25 is a region which allows an operator's designation on the type whose history is to be displayed in the first display region 21, to be input. In the example illustrated in FIG. 6, a state is displayed in which "generated power result history" and "insolation profile history" are displayed as the type, and the "generated power result history" is designated by the operator.

The history designation input region 24 is a region which allows the operator to select and designate a desired period among the present and past results displayed in the first display region 21 in relation to the type designated in the history display type designation input region 25. Pull-down buttons are provided on a right column of the history designation input region 24. The operator can designate a desired period by using the pull-down buttons. A blank column is provided among options using the pull-down button, and the operator may input a desired period for himself/herself with an input device such as a keyboard or a mouse (not illustrated) after designating the blank column. In the example illustrated in FIG. 6, a state is illustrated in which "the present", "one year ago", and "two years ago" are designated. A period in which designated history is to be displayed is not limited to the designation of every year, and may be, for example, "the present", "yesterday", and "the day before yesterday". However, regarding designation of seasons, the insolation amount H greatly differs for each season, and thus a period in the same season is preferably designated.

As described above, if the "generated power result history" is designated in the history display type designation input region 25, and "the present", "one year ago", and "two years ago" are designated in the history designation input region 24, a profile of a solar generated power result corresponding to each item is displayed in the first display region 21 so as to be referred to. Consequently, the operator can set the parameters X and Y in the above Equation (1) to desired values by referring to the system diagram of the solar power generation system displayed in the second display region 22 and the solar generated power profiles corresponding to "the present", "one year ago", and "two years ago" displayed in the first display region 21. The parameters X and Y are set by using the parameter input region 23. In the same manner as the history designation input region 24, pull-down buttons are provided on the right column of the parameter input region 23. The operator selects and designates desired values among a plurality of values which are prepared as options in advance by using the pull-down buttons. A blank column may be provided among the options, and a desired value may be input by the operator by designating the blank column. FIG. 6 illustrates a state in which "abc" is set as the parameter X, and "efg" is set as the parameter Y. If the operator's input operation on the execution button 26 is received in this state, the terminal 12 transmits the set parameters X and Y to the general controller 9 via the external controller 11 and the network 8. If the parameters X and Y are received via a communication interface (not illustrated), the general controller 9 stores the parameters in a storage portion (not illustrated) of the standard generated power calculation unit 903, and performs calculation according to the above Equation (1) by using the stored parameters X and Y so as to calculate the standard generated power $P_{REF}$ as described above. A storage portion storing the parameters X and Y is not limited to the storage portion in the standard generated power calculation unit 903, and may be an external storage portion. A case where the "generated power result history" is designated has been described as an example in FIG. 6, but, similarly, also in a case where the "insolation profile history" is designated, the insolation profile history is displayed in the first display region 21. The history display type designation input region 25 may allow both of the "generated power result history" and the "insolation profile history" to be designated. In this case, both of the generated power result history and the insolation profile history are displayed in the first display region 21.

Figure 7:
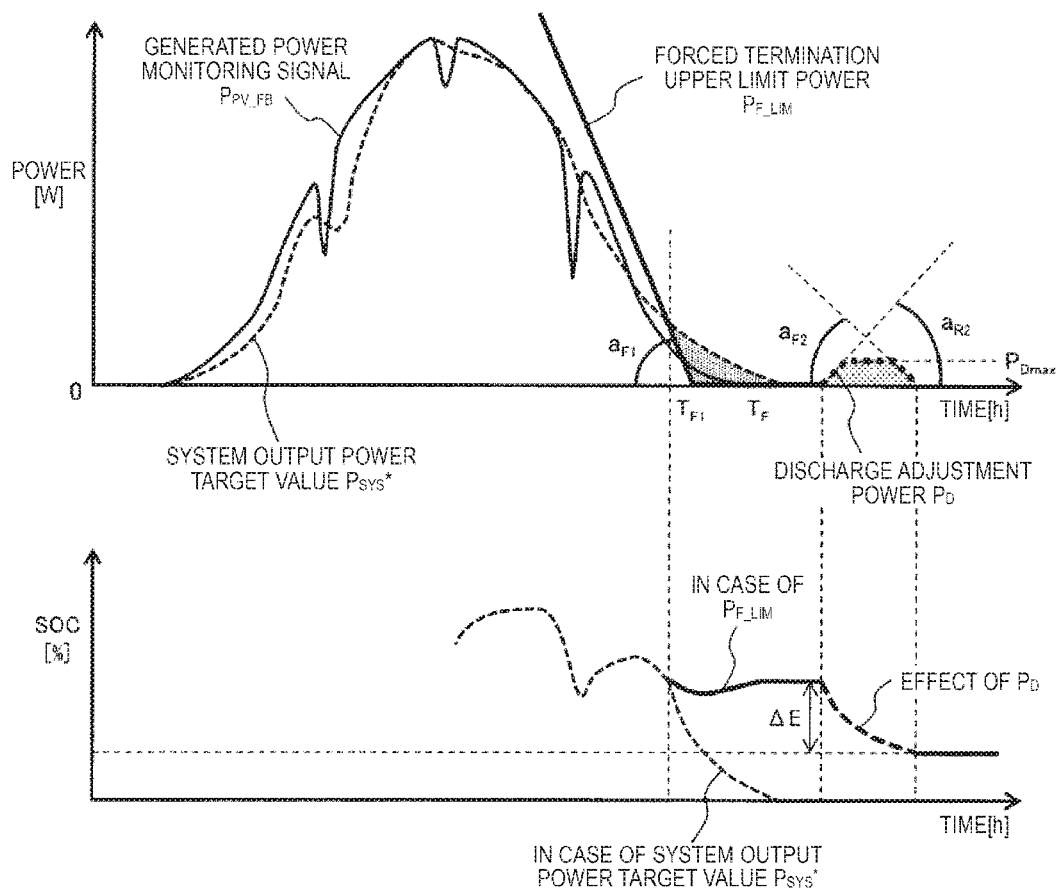
FIG. 7 illustrates time variations of a generated power monitoring signal and a system output power target value, and a relationship between the system output power target value, discharge adjustment power, and an SOC in Example 1.

FIG. 7 illustrates temporal changes of the generated power monitoring signal $P_{PV\_FB}$ and the system output power target value $P_{SYS}^*$, and a relationship between the system output power target value $P_{SYS}$, discharge adjustment power $P_D$, and a state of charge (SOC). If a low-pass filter is used in the smoothing unit 906, the storage battery 7 tends to be discharged due to an influence of a delay component of the filter before and after sunset (before and after the sunset time $T_F$), and thus there is a probability that the SOC of the storage battery 7 may be an over discharge state at night. Since the life of the storage battery 7 can be lengthened when the SOC thereof is maintained within an appropriate range, it is possible to achieve an effect of lengthening the life of the storage battery 7 if the SOC which is maintained to be constant at night can be made within an appropriate range. Therefore, for example, as indicated by a forced termination upper limit power $P_{F\_LIM}$ on an upper part of FIG. 7, a ramp upper limit value which is 0 at a time point (time point $T_{F1}$) before the sunset time $T_F$ is set, and is stored in a storage portion (not illustrated) of the system output correction unit 912 in advance.

The system output correction unit 912 compares the system output power target value $P_{SYS}*$ input from the recovery unit 907 with the forced termination upper limit power $P_{F\_LIM}$ stored in the storage portion (not illustrated). As a result of the comparison, if the system output power target value $P_{SYS}*$ exceeds the forced termination upper limit power $P_{F\_LIM}$, the system output correction unit 912 corrects the system output power target value $P_{SYS}*$ so as to match the forced termination upper limit power $P_{F\_LIM}$. As a result, the SOC of the storage battery 7 can be maintained to be high without reaching an over discharge state.

In a case where there is a deviation relative to an SOC level (hereinafter, referred to as a target SOC level) in which the life of the storage battery 7 is further lengthened, the charge/discharge output correction unit 915 corrects the charge/discharge target value $P_b*$ so that the storage battery 7 performs additional discharge by the discharge adjustment power $P_D$ illustrated in FIG. 7 at a predetermined time point after sunset (later than the sunset time $T_F$). Consequently, an SOC level of the storage battery 7 can be caused to reach the target SOC level. In FIG. 7, the forced termination upper limit power $P_{F\_LIM}$ and the discharge adjustment power $P_D$ are changed at specific change rates $a_{F1}$, $a_{F2}$, and $a_{R2}$, but if the change rates are appropriately selected according to, for example, power variation regulations of a predetermined power transmission operating agency which manages the power system 13, it is possible to adjust an SOC without deteriorating the performance of minimizing a variation in the solar generated power $P_{PV}$.

In the storage battery 7, inherently, the number of times of charge and discharge (cycle of charge and discharge) is inversely proportional to the storage battery life. As illustrated on the lower part of FIG. 7, the cycle of charge and discharge increases due to the storage battery 7 being discharged by $\Delta E$ after a predetermined time elapsed (night) from the sunset time $T_F$. However, the number of operations for reduction to the target SOC is only one after the sunset time $T_F$ in a day. Therefore, the storage battery 7 is hardly influenced by the increase in the cycle of charge and discharge, and rather it is possible to prevent a deterioration phenomenon of the storage battery 7 occurring due to a high SOC state being maintained. This is considerably effective in a case where a lithium ion battery is used as the storage battery 7, and the same effect can also be achieved in a case where other storage batteries are used.

Figure 8:
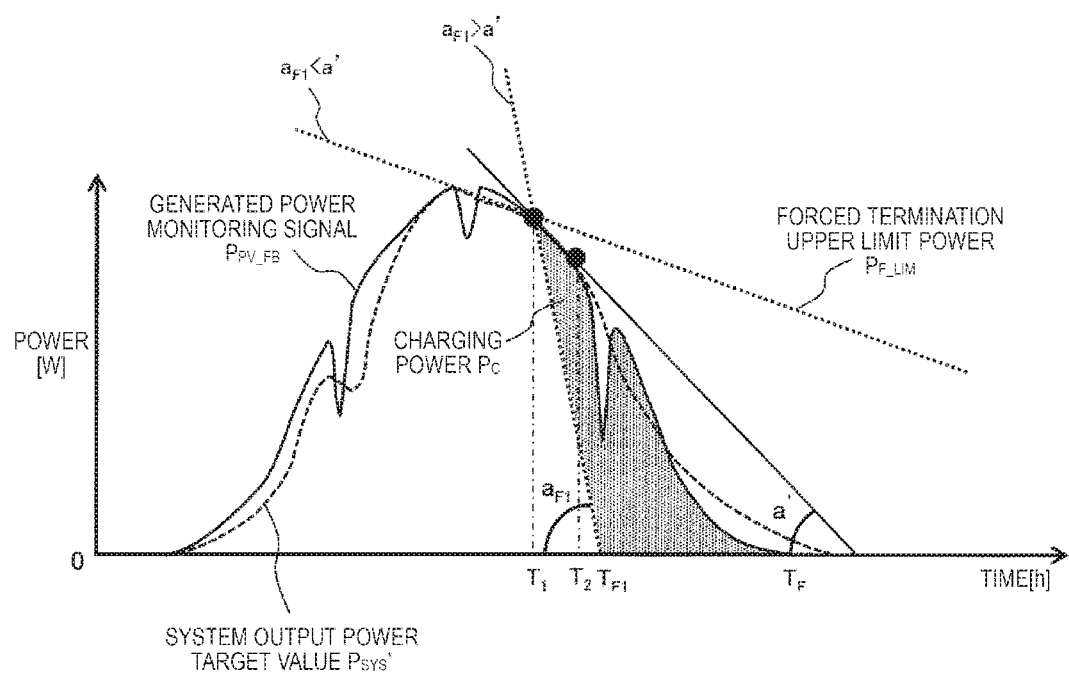
FIG. 8 is a diagram for explaining upper limit power for forced termination determined by a system output correction unit illustrated in FIG. 2.

FIG. 8 is a diagram for explaining the forced termination upper limit power $P_{F\_LIM}$ determined by the system output correction unit 912. The system output correction unit 912 acquires a time point t (current time) from the clocking unit 901 at a predetermined interval, for example, at the interval of 1 sec, and also acquires the system output power target value $P_{SYS}*$ output from the recovery unit 907. As illustrated in FIG. 8, the system output correction unit 912 obtains a tangential line which passes through the system output power target value $P_{SYS}*$ at a time point $T_1$ and calculates angles a' formed with the time axis in a sequential manner (every cycle) on the basis of profiles of the system output power target value $P_{SYS}*$ at the time point $T_1$ and the system output power target value $P_{SYS}*$ at a predetermined time before the time point $T_1$. The system output correction unit 912 calculates the change rate $a_{F1}$ every time on the basis of the calculated angle a', and obtains and sets the forced termination upper limit power $P_{F\_LIM}$. Therefore, the forced termination upper limit power $P_{F\_LIM}$ exhibits a value which changes for every predetermined cycle.

FIG. 8 illustrates a state in which the tangential line at the time point $T_1$ also passes through the system output power target value $P_{SYS}*$ at a time point $T_2$ after N hours elapse from the time point $T_1$. Therefore, the forced termination upper limit power $P_{F\_LIM}$ at the time point $T_1$ is the same as that at the time point $T_2$. For convenience of description, FIG. 8 illustrates that the storage battery 7 is charged with charging power $P_c$ corresponding to an area of a hatched region assuming that the forced termination upper limit power $P_{F\_LIM}$ which is calculated on the basis of the system output power target value $P_{SYS}*$ at the time point $T_1$ is set to a fixed value. The forced termination upper limit power $P_{F\_LIM}$ which is calculated for every predetermined cycle sequentially changes according to a variation in the system output power target value $P_{SYS}*$ in the 24-hour cycle.

As illustrated in FIG. 8, the system output correction unit 912 determines the slope $a_{F1}$ of the forced termination upper limit power $P_{F\_LIM}$ so that the slope is greater than the angle a' in order to secure a charging amount. If $a_{F1} < a'$, the charging power $P_c$ for the storage battery 7 is "0", but if $a_{F1} > a'$, the storage battery 7 is charged with the charging power $P_c$ corresponding to the area of the hatched region as described above. Consequently, it is possible to handle a steep variation in the solar generated power $P_{PV}$ in a day. FIG. 8 shows the forced termination upper limit power $P_{F\_LIM}$ as a simplified straight line as an example, but the present invention is not limited thereto. For example, the forced termination upper limit power $P_{F\_LIM}$ may be defined by using a curve corresponding to a slope ($a_{F1}$) which is sequentially updated.

Figure 9:
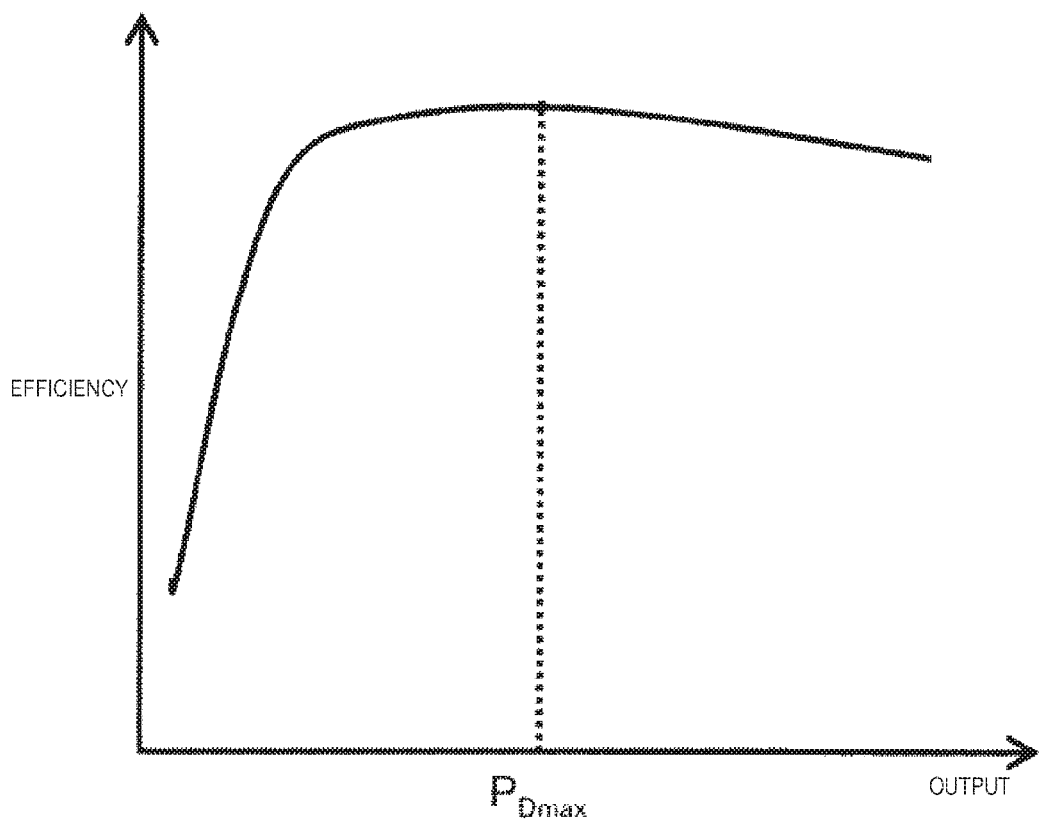
FIG. 9 is a diagram illustrating an efficiency curve of a PCS for a storage battery illustrated in FIG. 2.

FIG. 9 is a diagram illustrating an efficiency curve of the storage battery PCS illustrated in FIG. 2. An output from the storage battery PCS 6 is limited depending on the capacity of the storage battery PCS as described above. As illustrated in FIG. 9, an output upper limit value from the storage battery PCS 6 is defined as $P_{Dmax}$. As illustrated in FIG. 7, the system output power target value $P_{SYS}*$ exhibits a trapezoidal waveform profile having change rates $a_{F2}$ and $a_{R2}$ after a predetermined time elapses (night) from the sunset time $T_F$. An upper bottom of the trapezoidal waveform profile is constant, and thus the system output power target value $P_{SYS}*$ at this upper bottom is adjusted to the output $P_{Dmax}$ which brings the storage battery PCS 6 to the maximum efficiency. The storage battery 7 is discharged by the discharge adjustment power $P_D$ defined by an area of the trapezoidal waveform profile, and thus it is possible to achieve an effect of reducing system loss. This is because, in a case where the storage battery 7 is charged and discharged, conversion efficiency of the storage battery PCS 6 is associated with a system loss ratio. Therefore, the storage battery is charged and discharged around the output $P_{Dmax}$ which brings the storage battery PCS 6 to the maximum efficiency, and thus the system loss can be reduced.

Figure 10:
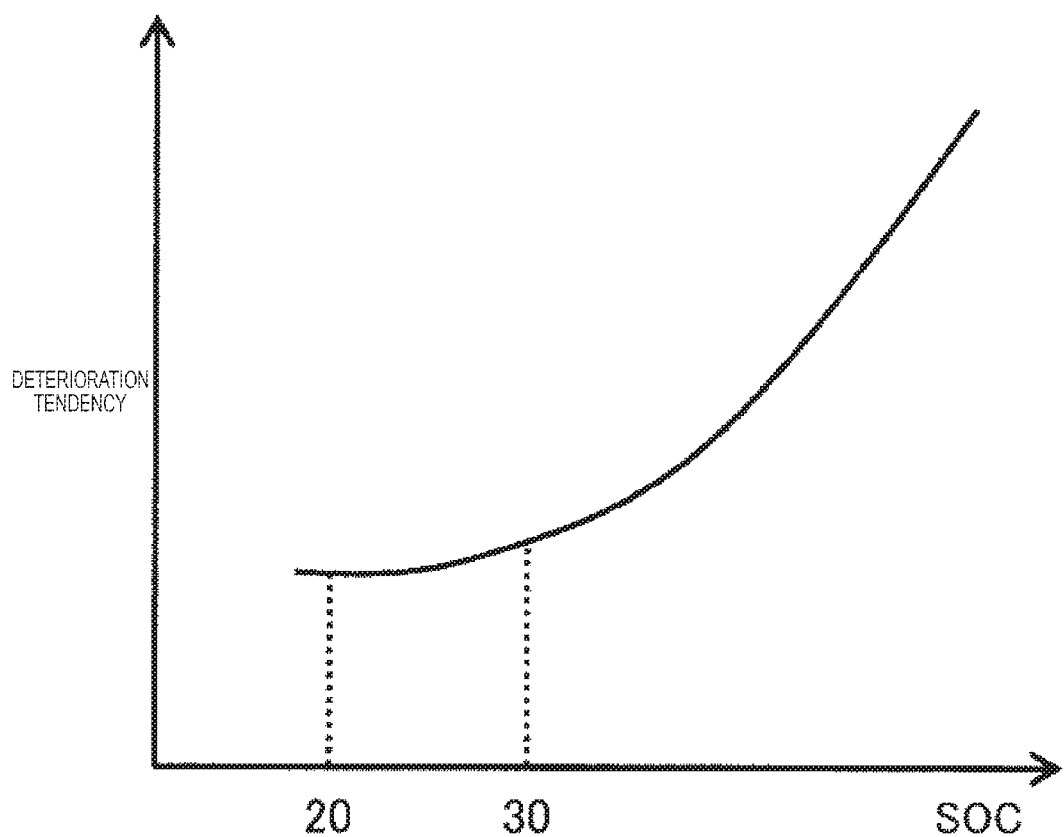
FIG. 10 is a diagram illustrating a relationship between a state of charge (SOC) and a deterioration tendency of a lithium ion battery in Example 1.

FIG. 10 is a diagram illustrating a relationship between a state of charge (SOC) and a deterioration tendency of a lithium ion battery (Li ion battery). The Li ion battery has a tendency that a forming speed of a solid electrolyte interface (SEI) as a coating film which inactivates and stabilizes a surface of graphite in a high SOC region is heightened. For this reason, there is a concern that preservation deterioration is accelerated. Therefore, the SOC is preferably maintained to be 30% or less after a predetermined time elapses (night) from the sunset time $T_F$. On the other hand, if the SOC is maintained in a state of 0%, it is hard to handle an abrupt discharge command at night. As mentioned above, in a case where the Li ion battery is used as the storage battery 7, the SOC is preferably maintained in a range from 20% to 30% at night.

Therefore, in the present example, in a case where a Li ion battery is used as the storage battery 7, a threshold value (hereinafter, referred to as a Li night SOC threshold value) is set within a range of the SOC from 20% to 30% after a predetermined time elapses (night) from the sunset time $T_F$, and the Li night SOC threshold value is stored in a storage portion (not illustrated) of the charge/discharge output correction unit 915. Here, the Li night SOC threshold value corresponds to an SOC which is reduced by $\Delta E$ due to an effect of the discharge adjustment power $P_D$ illustrated on the lower part of FIG. 7. In addition, not only the set Li night SOC threshold value but also the relationship between an SOC and a deterioration tendency of the Li ion battery illustrated in FIG. 10 may be stored in a storage portion (not illustrated).

Figure 11:
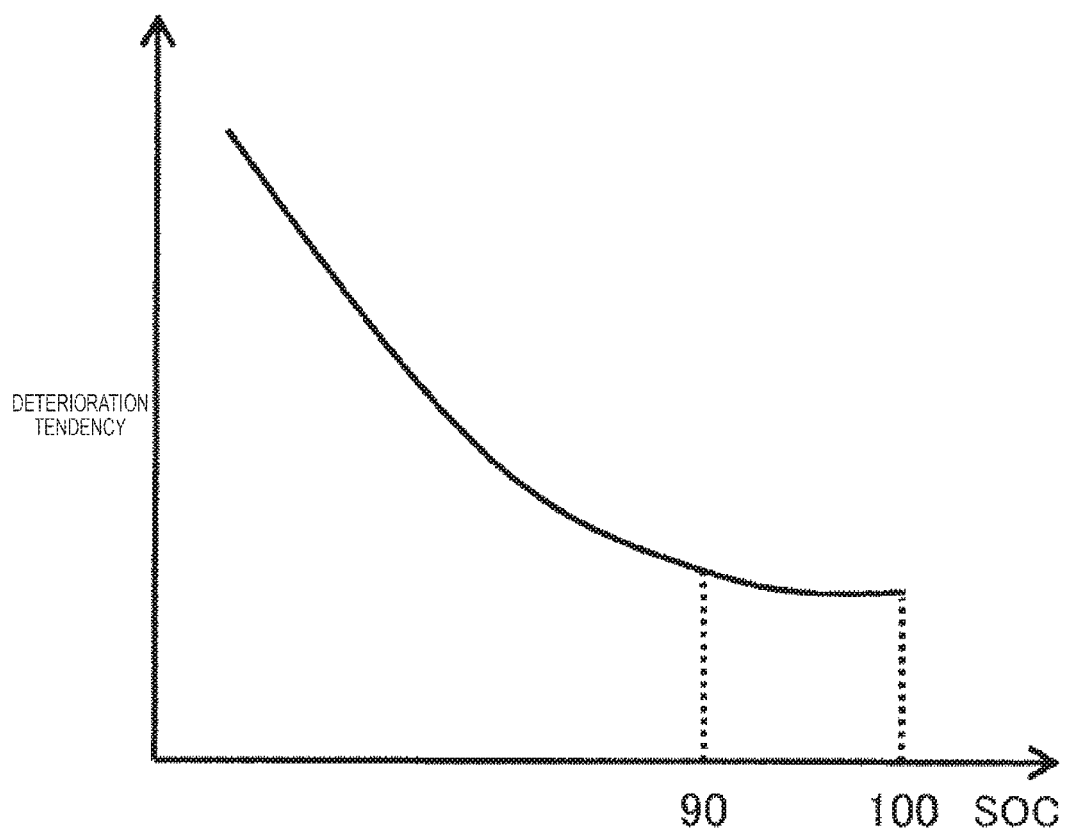
FIG. 11 is a diagram illustrating a relationship between a state of charge (SOC) and a deterioration tendency of a lead storage battery in Example 1.

FIG. 11 is a diagram illustrating a relationship between a state of charge (SOC) and a deterioration tendency of a lead storage battery. The lead storage battery has characteristics in which preservation deterioration is rather minimized in a high SOC region unlike the Li ion battery. This is because lead sulfate generated during reaction is crystallized through repeated dissolution and deposition, and this may prevent a chargeable state from occurring. Therefore, the SOC is preferably maintained in a range from 90% to 100% after a predetermined time elapses (nighttime) from the sunset time $T_F$. As described above, in a case where the lead storage battery is used as the storage battery 7, the SOC is preferably maintained in a range from 90% to 100% at night.

Therefore, in the present example, in a case where a lead storage battery is used as the storage battery 7, a threshold value (hereinafter, referred to as a Pb night SOC threshold value) is set within a range of the SOC from 90% to 100% after a predetermined time elapses (night) from the sunset time $T_F$, and the Pb night SOC threshold value is stored in the storage portion (not illustrated) of the charge/discharge output correction unit 915. However, the SOC scarcely reaches 90% or higher at night. Thus, in a case where the lead storage battery is used, discharge control at night is not performed, that is, the storage battery 7 is not discharged by the discharge adjustment power $P_D$. In addition, not only the Pb night SOC threshold value but also the relationship between an SOC and a deterioration tendency of the lead ion battery illustrated in FIG. 11 may be stored in a storage portion (not illustrated).

Figure 12:
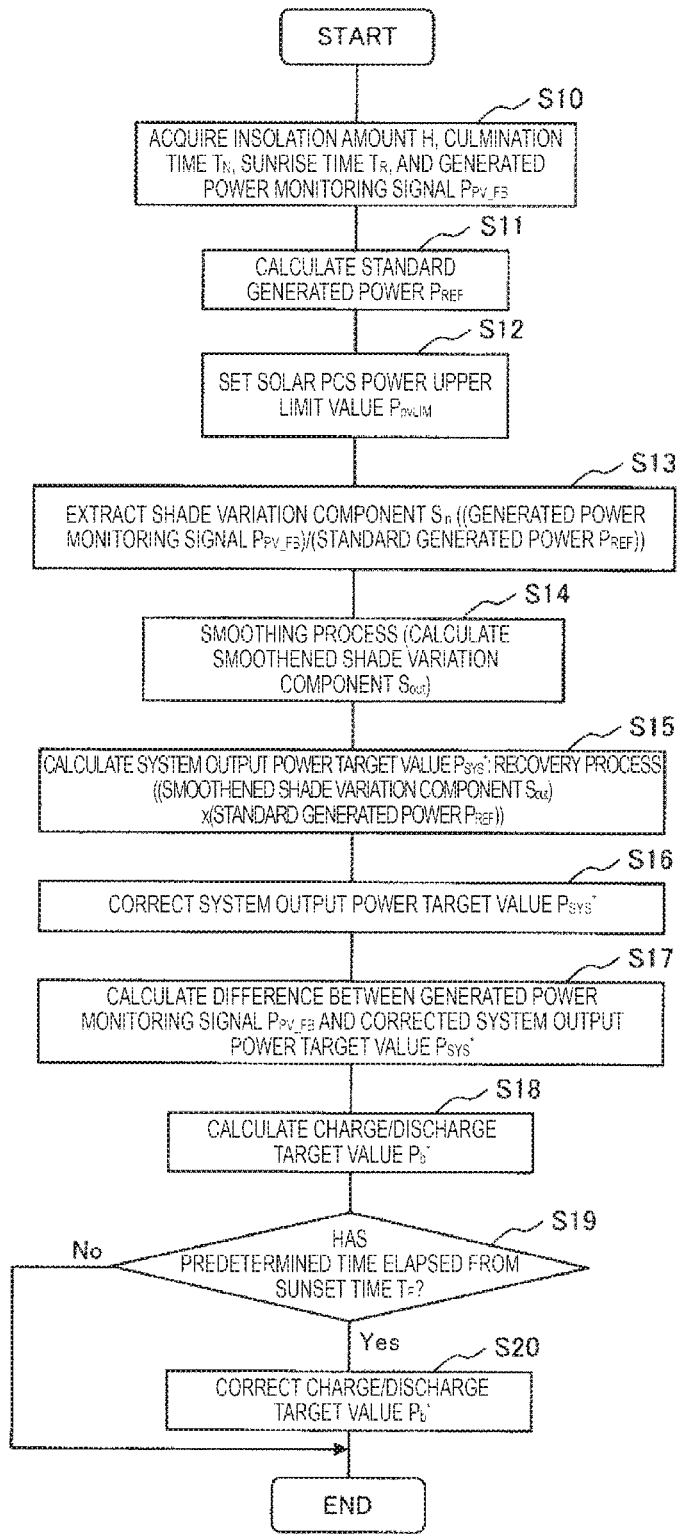
FIG. 12 is a flowchart illustrating processes performed by the general controller illustrated in FIG. 2.

Next, a description will be made of a flow of a series of processes performed by the general controller 9. FIG. 12 is a flowchart illustrating processes performed by the general controller 9.

The standard generated power calculation unit 903 constituting the general controller 9 acquires the insolation amount H, the culmination time $T_N$, the sunrise time $T_R$, and the generated power monitoring signal $P_{PV\_FB}$ (step S10).

The standard generated power calculation unit 903 calculates the standard generated power $P_{REF}$ by using the above Equation (1) (step S11). In step S12, the solar PCS power upper limit setting unit 910 sets the solar PCS power upper limit value $P_{pvLIM}$ in the first upper/lower limit limiter 904.

In step S13, the normalization unit 905 divides the generated power monitoring signal $P_{PV\_FB}$ by the standard generated power $P_{REF}$ which is obtained via the first upper/lower limit limiter 904, so as to extract the shade variation component $S_{in}$. In step S14, the smoothing unit 906 performs a smoothing process on the shade variation component $S_{in}$ obtained in step S13, so as to calculate the smoothened shade variation component $S_{out}$.

In step S15, the recovery unit 907 multiplies the smoothened shade variation component $S_{out}$ obtained in step S14 by the standard generated power $P_{REF}$ obtained via the first upper/lower limit limiter 904, so as to calculate the system output power target value $P_{SYS}^*$. Successively, the system output correction unit 912 corrects the system output power target value $P_{SYS}^*$ which is input from the recovery unit 907 on the basis of a time point t (the current time) acquired from the clocking unit 901 (step S16).

Next, the subtractor 908 calculates a difference between the generated power monitoring signal $P_{PV\_FB}$ and the corrected system output power target value $P_{SYS}^*$ obtained in step S16 (step S17). The difference obtained in step S17 is input to the charge/discharge output correction unit 915 as the charge/discharge target value $P_b^*$ (step S18).

Next, in step S19, the charge/discharge output correction unit 915 receives a time point t (current time) from the clocking unit 901 and also receives the sunrise time $T_R$ from the sunrise detection unit 902, so as to determine whether or not a predetermined time has elapsed from the sunset time $T_F$. If the predetermined time has not elapsed as a result of the determination, the charge/discharge target value $P_b^*$ which is input in step S18 is output to the storage battery PCS 6 via the second upper/lower limit limiter 909. On the other hand, if the predetermined time has elapsed from the sunset time $T_F$ as a result of the determination, the flow proceeds to step S20.

In step S20, the charge/discharge output correction unit 915 corrects the charge/discharge target value $P_b^*$ which is input in step S18. The corrected charge/discharge target value $P_b^*$ is output to the storage battery PCS 6 via the second upper/lower limit limiter 909.

A control cycle in the general controller 9 has, for example, an order of several seconds (for example, 1 sec), and the processes from step S10 to step S20 are performed in this control cycle.

Figure 13:
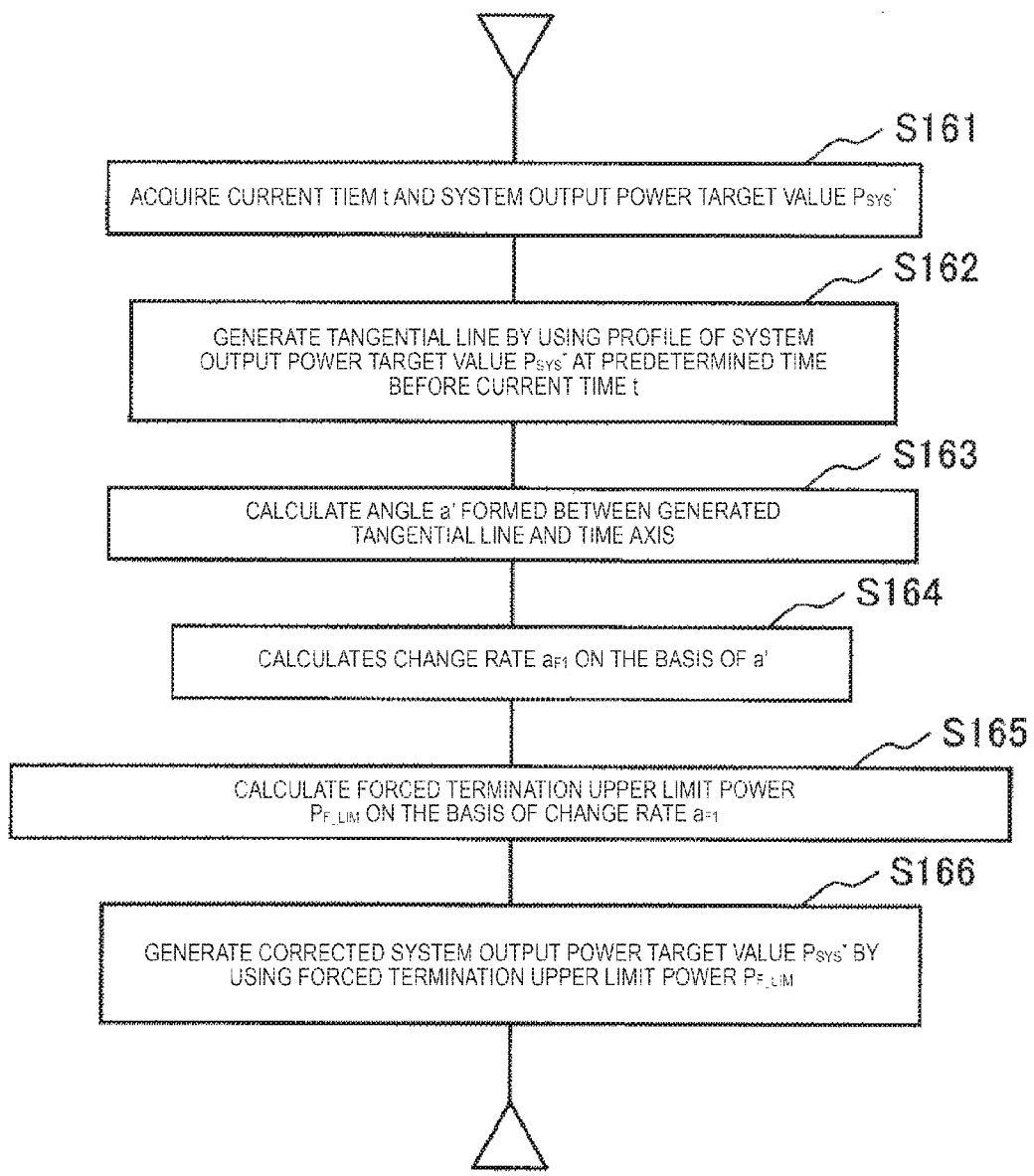
FIG. 13 is a diagram illustrating a process performed by the system output correction unit illustrated in FIG. 2.

Here, a description will be made of the process of correcting the system output power target value $P_{SYS}^*$ in step S16 illustrated in FIG. 12. FIG. 13 is a flowchart illustrating a process performed by the system output correction unit 912. In step S161, the system output correction unit 912 acquires the current time t from the clocking unit 901 and the system output power target value $P_{SYS}^*$ from the recovery unit 907. In step S162, the system output correction unit 912 generates a tangential line which passes through the system output power target value $P_{SYS}^*$ at the current time t on the basis of a profile of the system output power target value $P_{SYS}^*$ at a predetermined time before the current time t.

In step S163, the system output correction unit 912 calculates an angle a' (FIG. 8) formed between the generated tangential line and the time axis. A change rate $a_{F1}$ is calculated on the basis of the calculated angle a' (step S164). Next, the forced termination upper limit power $P_{F\_LIM}$ is calculated on the basis of the calculated change rate $a_{F1}$ (step S165). The system output correction unit 912 combines the obtained forced termination upper limit power $P_{F\_LIM}$ with the system output power target value $P_{SYS}^*$ before the current time t so as to generate a corrected system output power target value $P_{SYS}^*$ (step S166).

Figure 14:
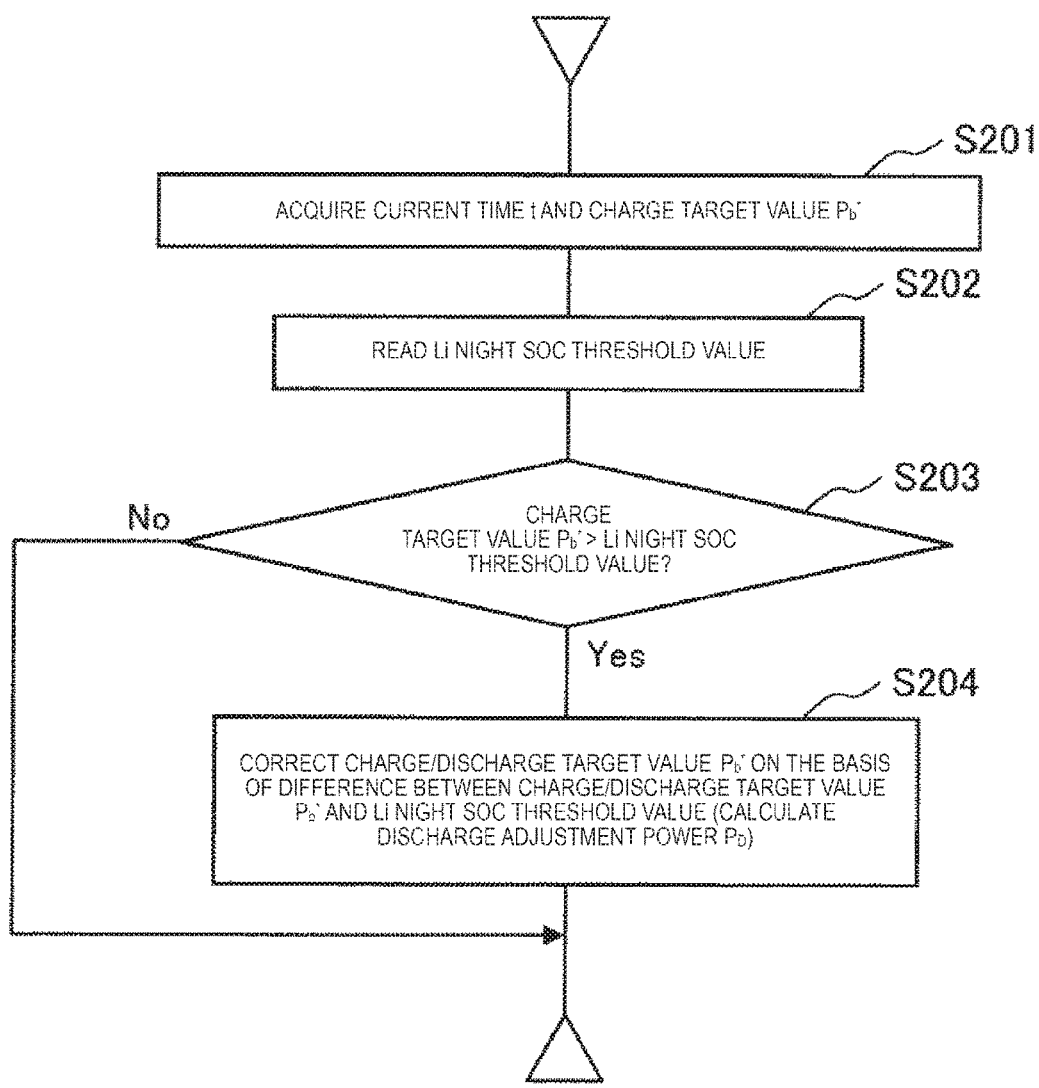
FIG. 14 is a flowchart illustrating a process performed by a charge/discharge output correction unit illustrated in FIG. 2.

A description will be made of the process of correcting the charge/discharge target value $P_b^*$ in step S20 illustrated in FIG. 12. FIG. 14 is a flowchart illustrating a process performed by the charge/discharge output correction unit 915. The charge/discharge output correction unit 915 acquires the current time t from the clocking unit 901, and the charge/discharge target value $P_b^*$ which is obtained as a difference between the generated power monitoring signal $P_{PV\_FB}$ and the corrected system output power target value $P_{SYS}^*$, from the subtractor 908 (step S201). In step S202, the charge/discharge output correction unit 915 reads a Li night SOC threshold value stored in the storage portion (not illustrated). In step S203, it is determined whether or not the charge/discharge target value $P_b^*$ is greater than the Li night SOC threshold value. If the charge/discharge target value $P_b^*$ is equal to or smaller than the Li night SOC threshold value as a result of the determination, the process is finished. On the other hand, if charge/discharge target value $P_b^*$ is greater than the Li night SOC threshold value as a result of the determination, the flow proceeds to step S204. In step S204, the charge/discharge target value is corrected by using a difference between the charge/discharge target value $P_b^*$ and the Li night SOC threshold value. Consequently, the discharge adjustment power $P_D$ is calculated, and the Li ion battery used as the storage battery 7 is set to a value which is reduced to the Li night SOC threshold value or smaller through discharge control.

In FIG. 14, a case where a Li ion battery is used as the storage battery 7 has been described as an example, but, also in a case where a lead storage battery is used, similarly, the charge/discharge target value $P_b^*$ is corrected through comparison with the above-described Pb night SOC threshold value. In the present example, a case where a Li ion battery or a lead storage battery is used as the storage battery 7 has been described as an example, but the present invention is not limited thereto. For example, in a mega-solar system, both a Li ion battery and a lead storage battery may be used. In this case, the charge/discharge output correction unit 915 constituting the general controller 9 may store a Li night SOC threshold value and a Pb night SOC threshold value in a storage portion (not illustrated) and perform the above-described process of correcting the charge/discharge target value $P_b^*$.

In the present example, the terminal 12 is connected to the external controller 11 which is connected to the general controller 9 via the network 8, but the present invention is not limited thereto, and the terminal 12 may be connected to the general controller 9 via a serial bus or a parallel bus.

As described above, according to the present example, a shade variation component is extracted, and a smoothing process (a primary delay filter or the like) is performed on only the extracted shade variation component. Thus, it is possible to reduce a difference between the standard generated power $P_{REF}$ and the system output power target value $P_{SYS}^*$. Consequently, the charge/discharge target value $P_b^*$ for the storage battery is optimized, and thus it is possible to reduce storage battery capacity while maintaining the performance of minimizing a variation in the solar generated power $P_{PV}$. Particularly, since a state of charge (SOC) of the storage battery in the nighttime is controlled depending on characteristics of the storage battery, the life of the storage battery can be lengthened.

EXAMPLE 2

Figure 15:
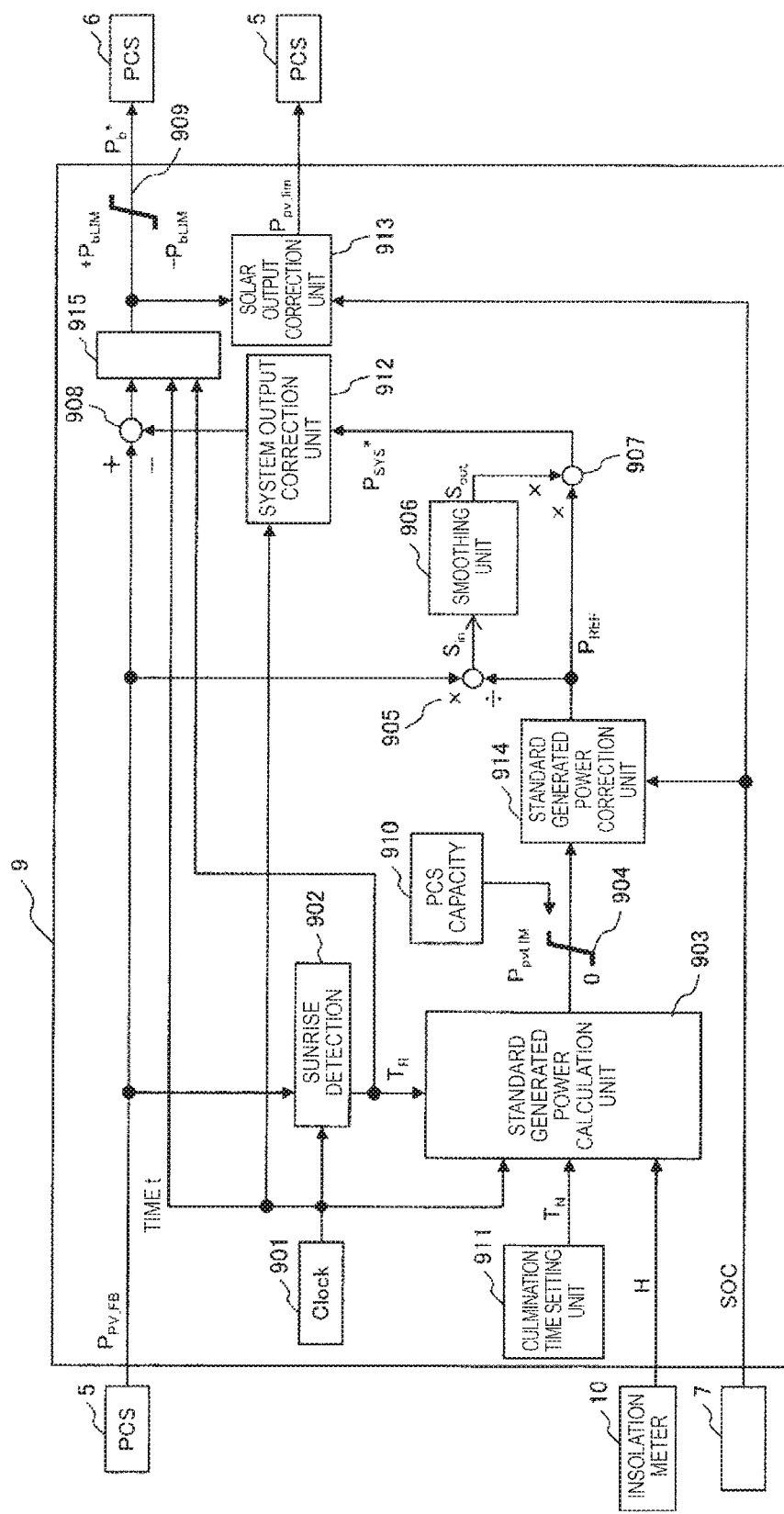
FIG. 15 is a functional block diagram illustrating a general controller of Example 2 as another Example of the present invention.

FIG. 15 is a functional block diagram illustrating a general controller of Example 2 as another Example of the present invention. The present example is different from Example 1 in that the general controller 9 additionally includes a standard generated power correction unit 914 which corrects the standard generated power $P_{REF}$ in the subsequent stage of the first upper/lower limit limiter 904 on the basis of a state of charge (SOC) from the storage battery 7, and the solar PCS 5 whose rating output is designed to be lower than the maximum power of the solar panel 4 is used. Other configurations are the same as those in the above Example 1, and description overlapping that in Example 1 will not be repeated.

In FIG. 15, the standard generated power correction unit 914 corrects the standard generated power $P_{REF}$ which is calculated by the standard generated power calculation unit 903 and is obtained via the first upper/lower limit limiter 904, on the basis of a state of charge (SOC) acquired from the storage battery 7. For example, if the acquired state of charge (SOC) is high, the standard generated power correction unit 914 corrects the parameters X and Y in the above Equation (1) so as to correct the standard generated power $P_{REF}$, and thus adjusts a difference between the solar generated power $P_{PV}$ and the system output $P_{SYS}$. Since there is a tendency for SOC likelihood to be restricted if a power amount of the storage battery 7 is minimized, the power amount of the storage battery 7 can be reduced by controlling the state of charge (SOC) within an appropriate range. An output from the standard generated power correction unit 914 branches so as to be input to the normalization unit 905 and the recovery unit 907.

Figure 16:
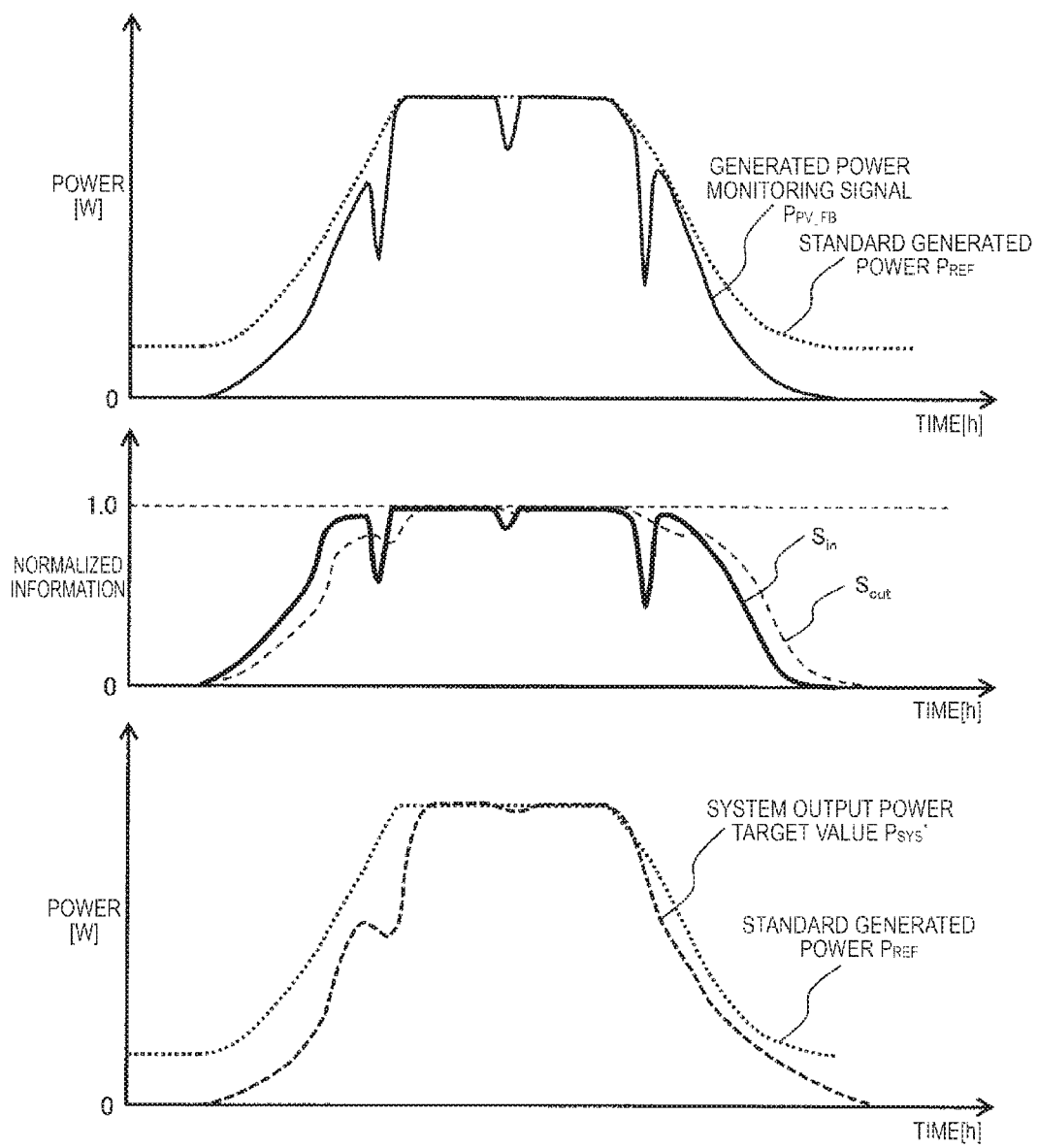
FIG. 16 illustrates a temporal change of each power signal in the general controller illustrated in FIG. 15.

Here, FIG. 16 illustrates a temporal change of each power signal in the general controller 9. On an upper part of FIG. 16, a temporal change of the generated power monitoring signal $P_{PV\_FB}$ input from the solar PCS 5 is indicated by a solid line, and a temporal change of the standard generated power $P_{REF}$ which is calculated by the standard generated power calculation unit 903 (FIG. 15) and is obtained via the first upper/lower limit limiter 904 (FIG. 15) is indicated by a dotted line. On an intermediate part thereof, a temporal change of the shade variation component $S_{in}$, output from the normalization unit 905 (FIG. 15) is indicated by a solid line, and a temporal change of the smoothened shade variation component $S_{out}$ output from the smoothing unit 906 (FIG. 15) is indicated by a dotted line. On a lower part thereof, a temporal change of the system output power target value $P_{SYS}^*$ output from the recovery unit 907 (FIG. 15) is indicated by a thick dotted line, and a temporal change of the standard generated power $P_{REF}$ which is calculated by the standard generated power calculation unit 903 and is obtained via the first upper/lower limit limiter 904 is indicated by a dotted line.

The solar PCS 5 of the present example is designated to have rating power lower than the maximum power of the solar panel 4. Therefore, as illustrated on the upper part of FIG. 16, the generated power monitoring signal $P_{PV\_FB}$ which is a monitoring signal of the solar generated power $P_{PV}$ measured by the solar PCS 5 tends to have a profile whose top is flat since a peak of the solar generated power $P_{PV}$ is cut. The solar PCS power upper limit setting unit 910 sets the solar PCS power upper limit value $P_{pvLIM}$ corresponding to the rating power of the solar PCS 5 in the first upper/lower limit limiter 904. Consequently, the standard generated power $P_{REF}$ calculated by the standard generated power calculation unit 903 is limited by the first upper/lower limit limiter 904. A profile of the standard generated power $P_{REF}$ having passed through the first upper/lower limit limiter 904 becomes a profile whose top is flat in the same manner as in the generated power monitoring signal $P_{PV\_FB}$ as illustrated on the upper part of FIG. 16.

In profiles of the shade variation component $S_{in}$ obtained by the normalization unit 905 and the smoothened shade variation component $S_{out}$ obtained by the smoothing unit 906, in the same manner as in Example 1 (FIG. 3), only a shade variation component is extracted by removing a variation component in the 24-hour cycle as illustrated on the intermediate part of FIG. 16. As mentioned above, the smoothing unit 906 performs the smoothing process described in Example 1 on only the shade variation component $S_{in}$, and thus the system output power target value $P_{SYS}^*$ which is not delayed relative to the variation component in the 24-hour cycle is obtained as illustrated on the lower part of FIG. 16. Therefore, the profile of the system output power target value $P_{SYS}^*$ also becomes a profile whose top is flat.

Here, FIG. 17 illustrates temporal changes of a generated power monitoring signal and standard generated power in the present example and a comparative example. A configuration of the comparative example is the same as the configuration disclosed in JP-A-2010-22122. An upper part of FIG. 17 illustrates the profiles of the generated power monitoring signal $P_{PV\_FB}$ and the standard generated power $P_{REF}$ illustrated on the upper part of FIG. 16. A lower part of FIG. 17 illustrates profiles of a combined generated power target value and the generated power monitoring signal $P_{PV\_FB}$ in the comparative example, corresponding to the standard generated power $P_{REF}$ of the present example.

As illustrated in FIG. 17, in the configuration of the comparative example, it can be seen that a deviation between the combined generated power target value and the generated power monitoring signal $P_{PV\_FB}$ increases. In other words, the combined generated power target value of the comparative example has a profile in which there is a delay relative to a variation component of the generated power monitoring signal $P_{PV\_FB}$ in the 24-hour cycle. If the deviation increases as mentioned above, this naturally influences the system output power target value $P_{SYS}$ illustrated in FIG. 16. In contrast, in the present example, it can be seen that a deviation between the generated power monitoring signal $P_{PV\_FB}$ and the standard generated power $P_{REF}$ is minimized, and thus the standard generated power $P_{REF}$ is obtained which is not delayed relative to the variation component of the generated power monitoring signal $P_{PV\_FB}$ in the 24-hour cycle.

Consequently, the deviation is reduced compared with the configuration of the comparative example. Therefore, according to the present example, it is possible to reduce an influence on the system output power target value $P_{SYS}^*$. In other words, an error component in the normalization unit 905 is minimized and thus unnecessary charge and discharge in the storage battery 7 are reduced. Therefore, the capacity of the storage battery 7 can be more considerably reduced than in the configuration of the comparative example. In other words, it is possible to achieve an effect of being capable of minimizing power and a power amount of the storage battery 7.

Figure 18:
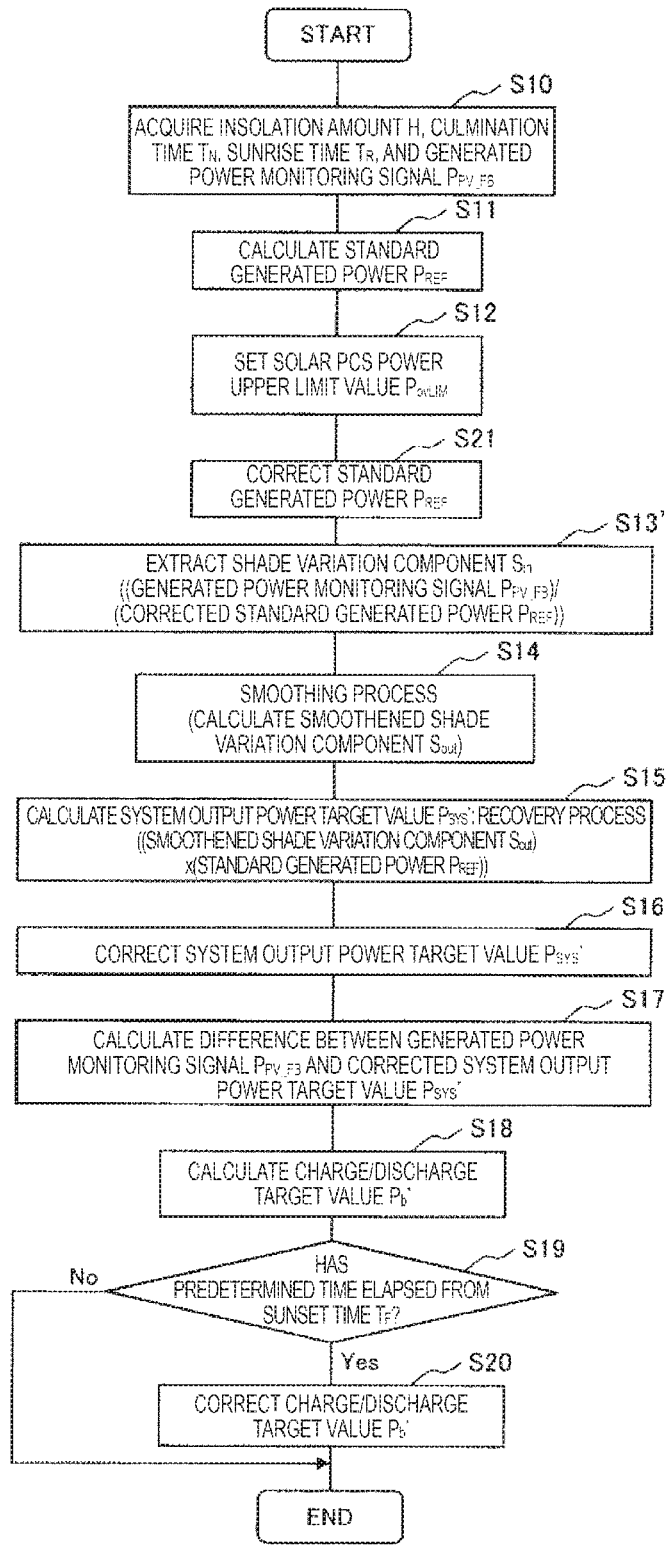
FIG. 18 is a flowchart illustrating processes performed by the general controller illustrated in FIG. 15.

Here, a description will be made of a flow of processes performed by the general controller 9. FIG. 18 is a flowchart illustrating processes performed by the general controller 9 illustrated in FIG. 15. First, steps S10 to S12 are the same as those illustrated in FIG. 12 in Example 1.

In step S21, the standard generated power correction unit 914 acquires the standard generated power $P_{REF}$ which has passed the first upper/lower limit limiter 904 in which the solar PCS power upper limit value $P_{pvLIM}$ is set by the solar PCS power upper limit setting unit 910 in step S12. The standard generated power correction unit 914 acquires a state of charge (SOC) from the storage battery 7, corrects the standard generated power $P_{REF}$ on the basis of the acquired SOC, and outputs the corrected standard generated power $P_{REF}$ to the normalization unit 905 and the recovery unit 907.

In step S13', the normalization unit 905 divides the generated power monitoring signal $P_{PV\_FB}$ measured by the solar PCS 5 by the corrected standard generated power $P_{REF}$ output from the standard generated power correction unit 914 so as to extract the shade variation component $S_{in}$. In other words, the shade variation component $S_{in}$ is obtained as follows.

Shade variation component $S_{in}$=(generated power monitoring signal $P_{PV\_FB}$)/(corrected standard generated power $P_{REF}$)

Steps S14 to S20 are the same as those illustrated in FIG. 12 in Example 1 and thus description thereof will be omitted.

As mentioned above, according to the present example, the standard generated power correction unit corrects the standard generated power on the basis of an SOC of the storage battery, and thus it is possible to reduce the capacity of the storage battery more than in the configuration of Example 1. The solar PCS which is designed to have a low rating output is used, and thus it is also possible to reduce an equipment investment cost for the PCS.

The present invention is not limited to the above-described Examples and includes various modifications. For example, the above Examples have been described in detail for better understanding of the present invention, and are not necessarily limited to including all the configurations described above. Some configurations of certain Examples may be replaced with configurations of other Examples, and the configurations of other Examples may be added to the configuration of certain Examples. The configurations of other Examples may be added to, deleted from, and replaced with some of the configurations of each Example.

What is claimed is:

1. A solar power generation system comprising:
   a storage battery;
   a solar power generation device that is provided on the side of the storage battery and outputs solar generated power; and
   a power control device,
   wherein the power control device includes
      a variation component extraction unit that extracts a shade variation component from a generated power signal measured by the solar power generation device;
      a smoothing unit that smoothens the shade variation component obtained by the variation component extraction unit;
      a system output correction unit that obtains a system output power target value which is a combined output between a discharge output of the storage battery and the solar generated power on the basis of an output signal from the smoothing unit; and
      a charge/discharge output correction unit that corrects a charge/discharge target value which is a difference between the system output power target value and the generated power signal on the basis of a current time and a state of charge of the storage battery.

2. The solar power generation system according to claim 1,
   wherein the power control device further includes a standard generated power calculation unit that obtains generated power obtained by the solar power generation device in fine weather as standard generated power, and
   wherein the variation component extraction unit extracts the shade variation component on the basis of the generated power signal and the standard generated power.

3. The solar power generation system according to claim 2,
wherein the charge/discharge output correction unit holds a threshold value of the state of charge in a preset nighttime period, and corrects the charge/discharge target value in a case where the current time is the set nighttime period and the state of charge of the storage battery exceeds the threshold value.

4. The solar power generation system according to claim 3,
wherein the charge/discharge output correction unit holds information for defining different correspondence relationships between states of charge and deterioration tendencies depending on the type of storage battery, and sets a threshold value of the state of charge on the basis of the correspondence relationships between the states of charge and the deterioration tendencies.

5. The solar power generation system according to claim 3,
wherein the system output correction unit calculates a change rate of a system output power target value at the current time on the basis of a current value and a system output power target value at a predetermined time before the current time among the system output power target values obtained in a predetermined cycle, obtains forced termination upper limit power having a change rate which is higher than the calculated change rate, and combines the obtained forced termination upper limit power with a system output power target value up to the current time so as to generate a corrected system output power target value.

6. The solar power generation system according to claim 5,
wherein the power control device further includes a terminal provided with an insolation meter measuring an insolation amount and a display unit,
wherein the display unit of the terminal includes
a first display region that displays generated power output results of the solar power generation device and/or history of the insolation amount;
a second display region that displays a system diagram of the solar power generation system; and
a third display region that receives inputting of a parameter for defining the standard generated power.

7. A storage battery system comprising:
a storage battery that performs charging and discharging with solar generated power output from a solar power generation device; and
a power control device,
wherein the power control device includes
a variation component extraction unit that extracts a shade variation component from a generated power signal measured by the solar power generation device;
a smoothing unit that smoothens the shade variation component obtained by the variation component extraction unit;
a system output correction unit that obtains a system output power target value which is a combined output between a discharge output of the storage battery and the solar generated power on the basis of an output signal from the smoothing unit; and
a charge/discharge output correction unit that corrects a charge/discharge target value which is a difference between the system output power target value and the generated power signal on the basis of a current time and a state of charge of the storage battery.

8. The storage battery system according to claim 7,
wherein the power control device further includes a standard generated power calculation unit that obtains generated power obtained by the solar power generation device in fine weather as standard generated power, and
wherein the variation component extraction unit extracts the shade variation component on the basis of the generated power signal and the standard generated power.

9. The storage battery system according to claim 8,
wherein the charge/discharge output correction unit holds a threshold value of the state of charge in a preset nighttime period, and corrects the charge/discharge target value in a case where the current time is the set nighttime period and the state of charge of the storage battery exceeds the threshold value.

10. The storage battery system according to claim 9,
wherein the charge/discharge output correction unit holds information for defining different correspondence relationships between states of charge and deterioration tendencies depending on the type of storage battery, and sets a threshold value of the state of charge on the basis of the correspondence relationships between the states of charge and the deterioration tendencies.

11. The storage battery system according to claim 9,
wherein the system output correction unit calculates a change rate of a system output power target value at the current time on the basis of a current value and a system output power target value at a predetermined time before the current time among the system output power target values obtained in a predetermined cycle, obtains forced termination upper limit power having a change rate which is higher than the calculated change rate, and combines the obtained forced termination upper limit power with a system output power target value up to the current time so as to generate a corrected system output power target value.

12. A power control device comprising:
a variation component extraction unit that extracts a shade variation component from a generated power signal measured by a solar power generation device;
a smoothing unit that smoothens the shade variation component obtained by the variation component extraction unit;
a system output correction unit that obtains a system output power target value which is a combined output between a discharge output of a storage battery and the solar generated power on the basis of an output signal from the smoothing unit; and
a charge/discharge output correction unit that corrects a charge/discharge target value which is a difference between the system output power target value and the generated power signal on the basis of a current time and a state of charge of the storage battery.

13. The power control device according to claim 12, further comprising:
a standard generated power calculation unit that obtains generated power obtained by the solar power generation device in fine weather as standard generated power,
wherein the variation component extraction unit extracts the shade variation component on the basis of the generated power signal and the standard generated power.

14. The power control device according to claim 13,
wherein the charge/discharge output correction unit holds a threshold value of the state of charge in a preset nighttime period, and corrects the charge/discharge target value in a case where the current time is the set nighttime period and the state of charge of the storage battery exceeds the threshold value.

15. The power control device according to claim 13,
wherein the system output correction unit calculates a change rate of a system output power target value at the current time on the basis of a current value and a system output power target value at a predetermined time before the current time among the system output power target values obtained in a predetermined cycle, obtains forced termination upper limit power having a change rate which is higher than the calculated change rate, and combines the obtained forced termination upper limit power with a system output power target value up to the current time so as to generate a corrected system output power target value.

* * * * *